United States Patent
Claycomb et al.

(10) Patent No.: US 7,234,414 B2
(45) Date of Patent: Jun. 26, 2007

(54) MASTITIS DETECTION

(75) Inventors: Rodney Wayne Claycomb, Hamilton (NZ); David Simon Whyte, Hamilton (NZ)

(73) Assignee: Sensortec Limited, Hamilton (NZ)

( * ) Notice: Subject to any disclaimer, the term of this patent is extended or adjusted under 35 U.S.C. 154(b) by 52 days.

(21) Appl. No.: 10/920,408

(22) Filed: Aug. 18, 2004

(65) Prior Publication Data

US 2005/0123948 A1 Jun. 9, 2005

Related U.S. Application Data

(63) Continuation-in-part of application No. 10/917,350, filed on Aug. 13, 2004, now abandoned, which is a continuation-in-part of application No. 10/130,733, filed on Oct. 8, 2002, now abandoned.

(51) Int. Cl.
*A01J 5/013* (2006.01)
(52) U.S. Cl. .................. 119/14.02; 119/14.08; 119/14.14
(58) Field of Classification Search ........ 119/14.02, 119/14.18, 14.03, 14.08, 14.14; 73/863, 73/863.01, 863.31, 863.41; 435/287.2, 288.7
See application file for complete search history.

(56) References Cited

U.S. PATENT DOCUMENTS

| | | | |
|---|---|---|---|
| 4,830,011 A | | 5/1989 | Lim |
| 5,026,638 A * | | 6/1991 | Saperstein .............. 435/32 |
| 5,091,306 A * | | 2/1992 | Citri ........................ 435/27 |
| 5,132,210 A * | | 7/1992 | Adams et al. ........... 435/7.33 |
| 5,168,044 A * | | 12/1992 | Joyce et al. ............. 435/7.24 |
| 5,743,209 A | | 4/1998 | Bazin |
| 5,807,684 A * | | 9/1998 | Simmons et al. ........ 435/7.1 |
| 6,031,367 A * | | 2/2000 | Mangan ................. 324/71.4 |
| 6,148,766 A * | | 11/2000 | van der Lely .......... 119/14.08 |
| 6,720,160 B2 * | | 4/2004 | Wolde-Mariam ........ 435/7.32 |
| 6,872,709 B2 * | | 3/2005 | Kumagal et al. ........... 514/33 |

FOREIGN PATENT DOCUMENTS

| | | |
|---|---|---|
| EP | 0137367 B1 | 4/1985 |
| EP | 0 628 244 A1 | 12/1994 |
| EP | 0748156 B1 | 12/1996 |
| WO | 9740374 A1 | 10/1997 |

OTHER PUBLICATIONS

Fell et al., "Factors Affecting the Viscometric Method for Estimating the Somatic Cell Count of Cow's Milk," J. Milk Fd. Technology 34(82) : 82-84 (1 97 1).*

Kernohan, E.A., "Observations of the Practical Use of the Rapid Mastitis Test," *The Australian Journal of Dairy Technology* 23: 129-130 (1968).

(Continued)

*Primary Examiner*—Yvonne R. Abbott
(74) *Attorney, Agent, or Firm*—Lowe Hauptman & Berner LLP

(57) ABSTRACT

Method and apparatus for testing a milk for mastitis wherein the milk sample is admixed with a detergent under condition that increase the viscosity of the milk sample; the increased viscosity mixture is subjected to a further procedure for further increasing its viscosity; and the further increased viscosity mixture is then tested for an attribute of somatic cells, such as DNA. This determination is then used to establish if the cow from whom the milk came has mastitis.

34 Claims, 36 Drawing Sheets

OTHER PUBLICATIONS

Kiermeier, F. and K. Keis, "Semi-Quantitative Modification of the Schalm Test," *Milchwissenschaft[Milk Science International]* 19: 65-69 (1964).

Miline, J.R. and R. Smyth, "Rapid Determination of Somatic Cells in Milk," *New Zealand Journal of Dairy Science and Technology* 11:21-23 (1976).

Schalm, O.W. and D.O. Noorlander, "Experiments and Observations Leading to Development of the California Mastitis Test," *Journal of the American Veterinary Medical Association* 130(5): 199-207 (1957).

Thompson, D.I. and D.S. Postle, "The Wisconsin Mastitis Test—An Indirect Estimation of Leucocytes in Milk," *The Journal of Milk and Food Technology* 27: 271-275 (1964).

Whittlestone, W.C. and D.J. Allen, "An Automatic Viscometer for the Measurement of the California Mastitis Reaction," *The Australian Journal of Dairy Technology* 21: 138-139 (1966).

Whittlestone et al., "A Simple Semi-Automatic Viscometer for the Estimation of tSomatic Cells in Milk," *Milchwissenschaft [Milk Science International]*27(2): 84-86 (1972).

Whittlestone et al., "A Viscometric Method for the Estimation of Milk Cell Count," *Journal of Milk and Food Technology* 33: 351-54 (1970).

Woolford et al., "Changes in Electrical Conductivity and Somatic Cell Count Between Milk Fractions from Quarters Subclinically Infected with Particular Mastitis Pathogens," *Journal of Dairy Research* 65: 187-198 (1998).

Hamann et al.:Livestock Production Science 48(1997) 201-208; Potential of Specific Milk Composition Variables for Cow Health Management.

Nogai et al. Die Beeinflussung von Pyrovat und L(+)—Lactat in Milch; Institut Fur Hygiene und Technologie der Milch pp. 37-42 Oct. 7, 2004.

Dictionary of Agriculture, second edition, Peter Collins Publishing, 1996, pp. 158/159.

Jobst et al.; Application of Miniaturized Liquid Handling Biosensor Array for Milk Analysis; Transducers '95-Eurosensors X pp. 473-474.

Walstra et al.; Dairy technology, Principals of Milk Properties and Processing; pp. 98-99.

Pitkin et al.; The Possible Significance of Lactic Acid levels in Normal and Abnormal Milk Samples; Am. J. Vet. Res. Nov. 1964, 25. 109; pp. 1658-1662.

Whittlestone et al. The Australian Journal of Dairy Technology, Dec. 1966; pp. 138-139.

"An Automatic Viscometer for The Measurement of The California Mastitis Reaction," Whittleston, W.G. et al., Australian Journal of Dairy Technology Highett, vol. 21, Dec. 1966, pp. 138-139.

International Search Report.

* cited by examiner

Figure showing an example of a calibration curve

Cross section of rolling ball tube

Cell Counts before, during and after milking:
(White and Battery, 1965)

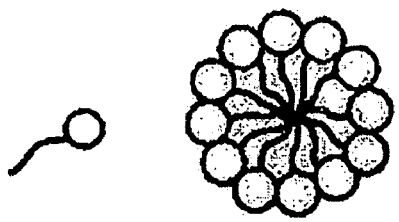
Figure 15[1]: Left; individual anionic molecule (detergent) with negatively charged head and hydrophobic carbon tail. Right; detergent micelle formed by detergent in aqueous solutions,
hiding the tails from water as much as possible.

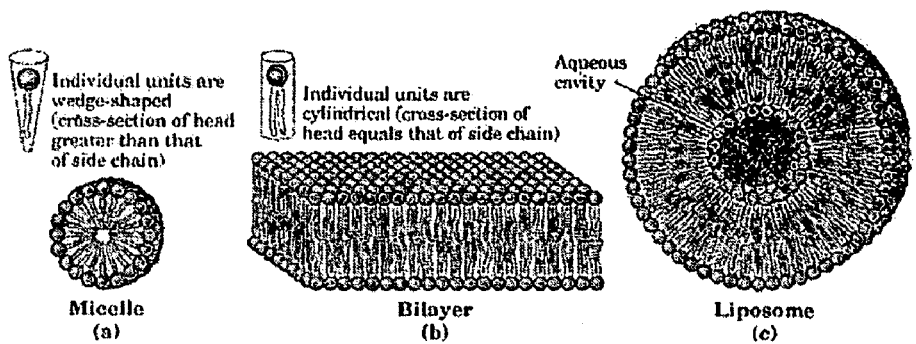
Figure 16[2]: Detergents form micelles (left) phospholipids form lipid bilayers (middle) and these bilayers curve around to form the outside of a cell, called a cell liposome. (right)

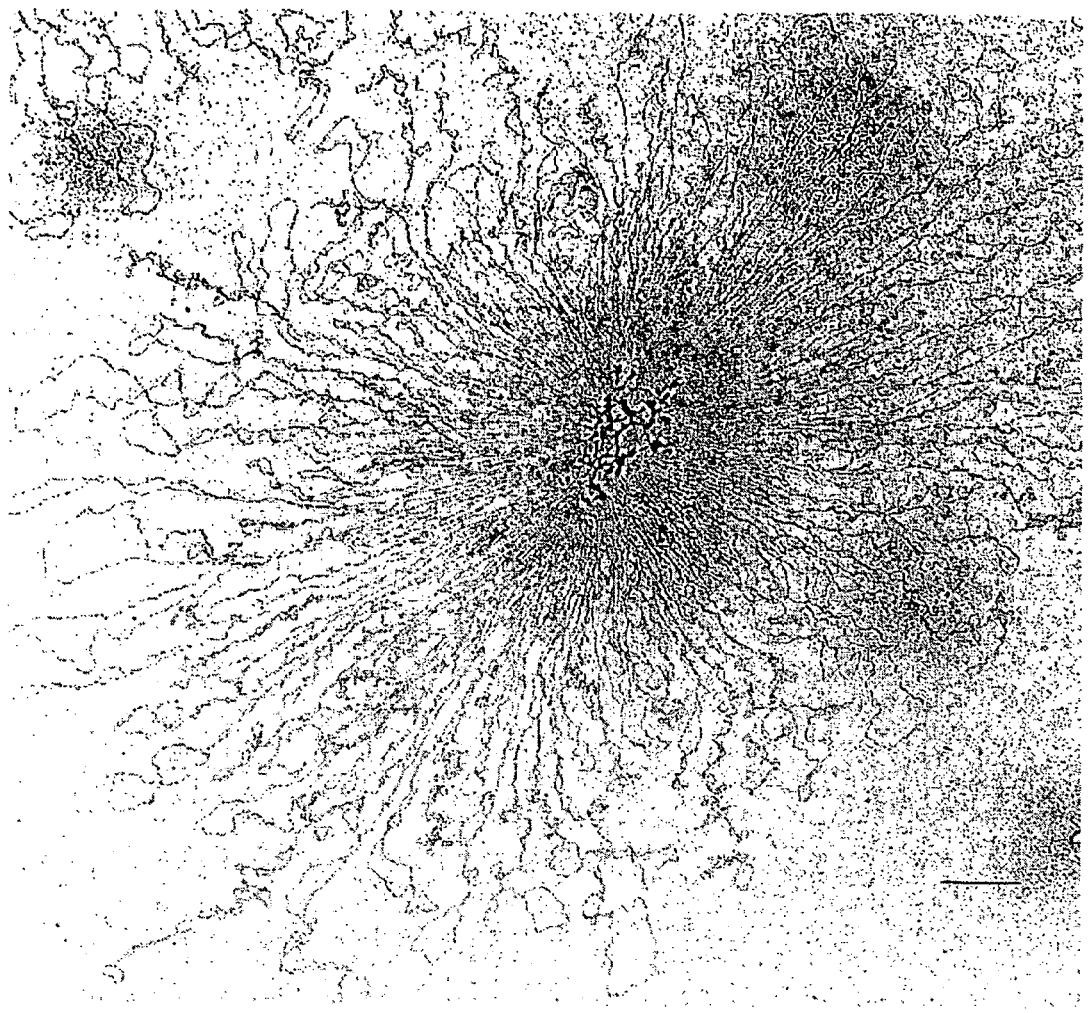
Figure 17[3]: Lysed cell, black blob in middle, releasing its DNA, strands surrounding it.

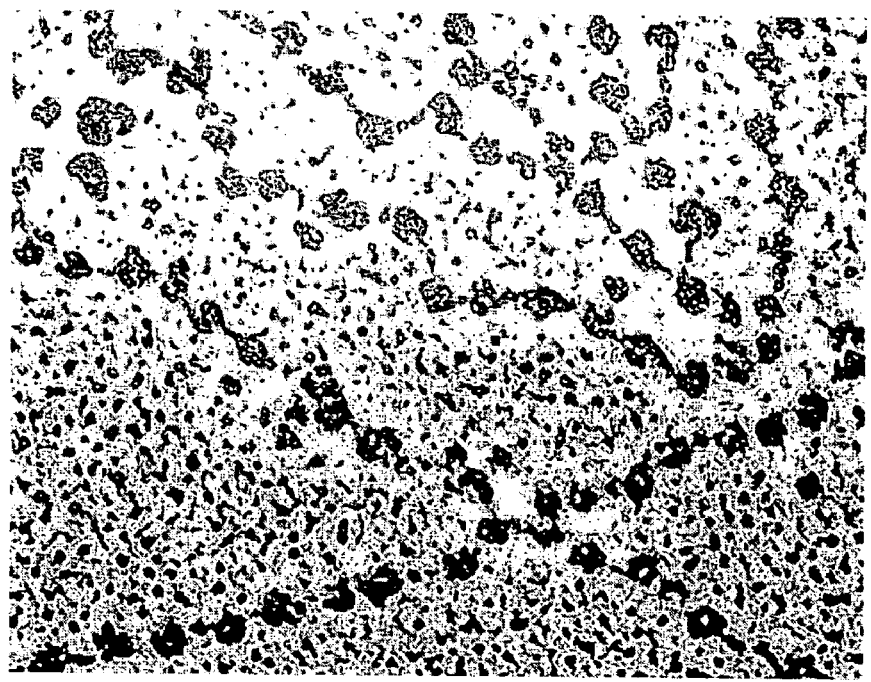
Figure 18[4]: Electron Microscope picture of DNA and associated histones. The "balls" are the histones and the "strands" that connect these together is the DNA.

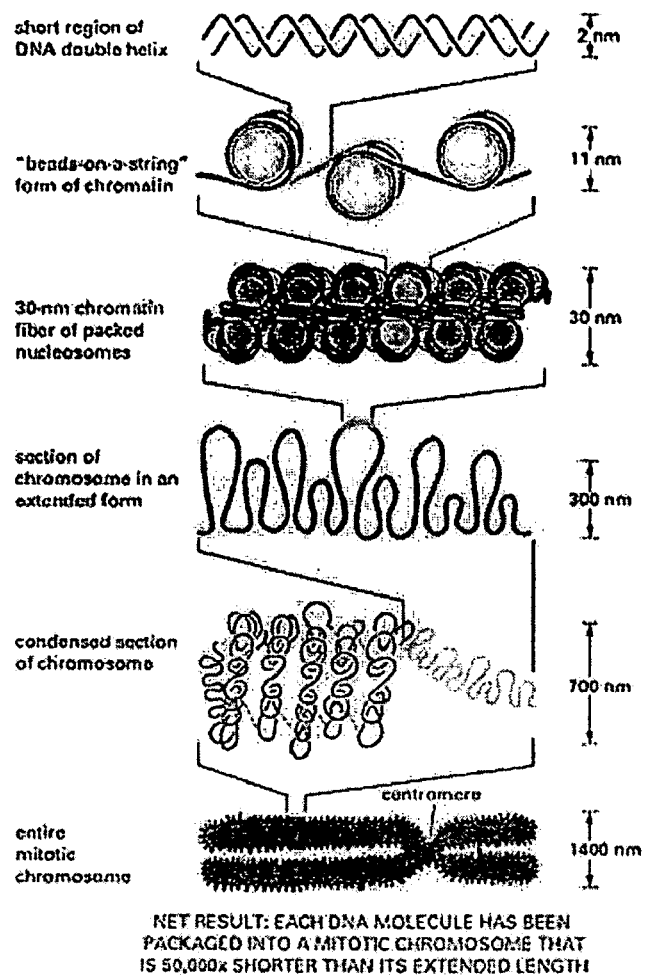
Figure 19: Packing of DNA into a chromosome making it possible to put meters of DNA into a cell[5].

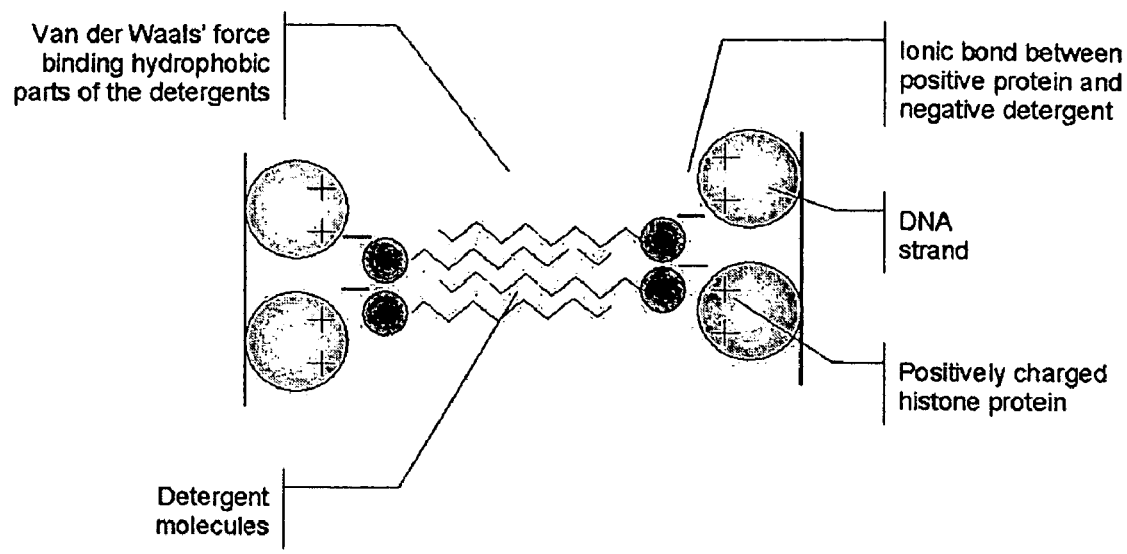
Figure 20: Schematic diagram of how the gel forms.

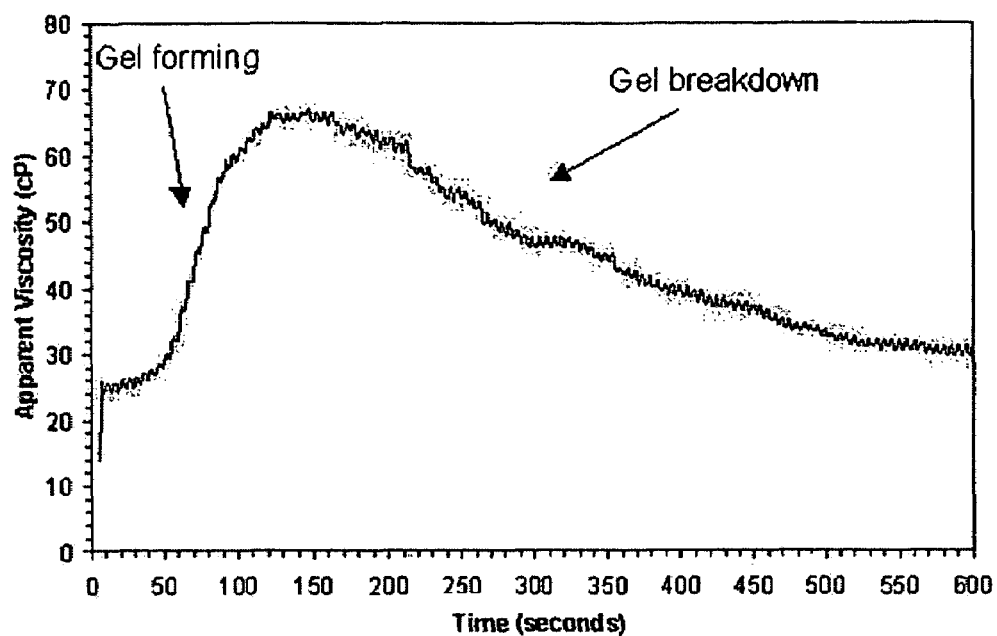
Figure 21: Experiment showing rheopectic and rheodestructive nature of CMT gel.

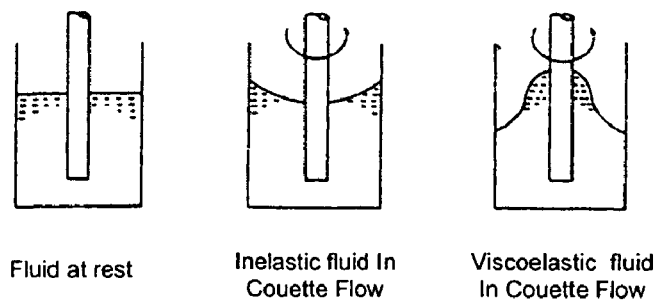
Figure 22: Simple determination of weather fluid is visco-elastic by rotating a spindle in the fluid and observing the fluids behaviour[6].

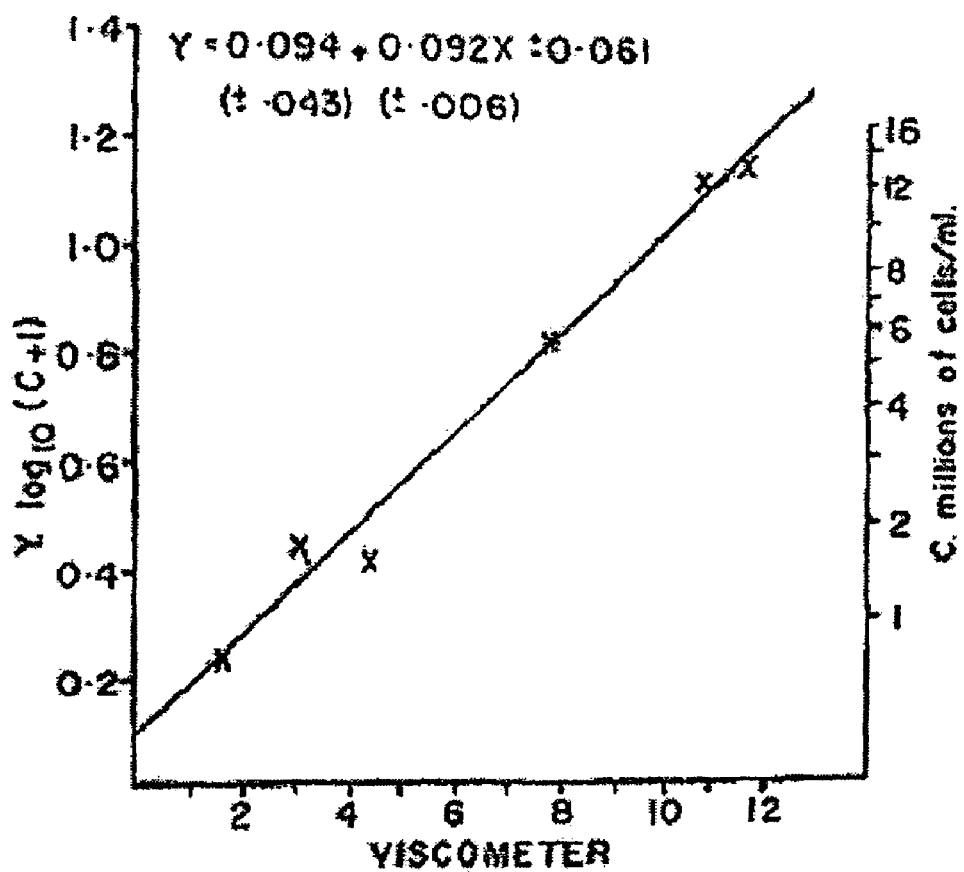
Figure 23: Results for rotary viscometer[7].

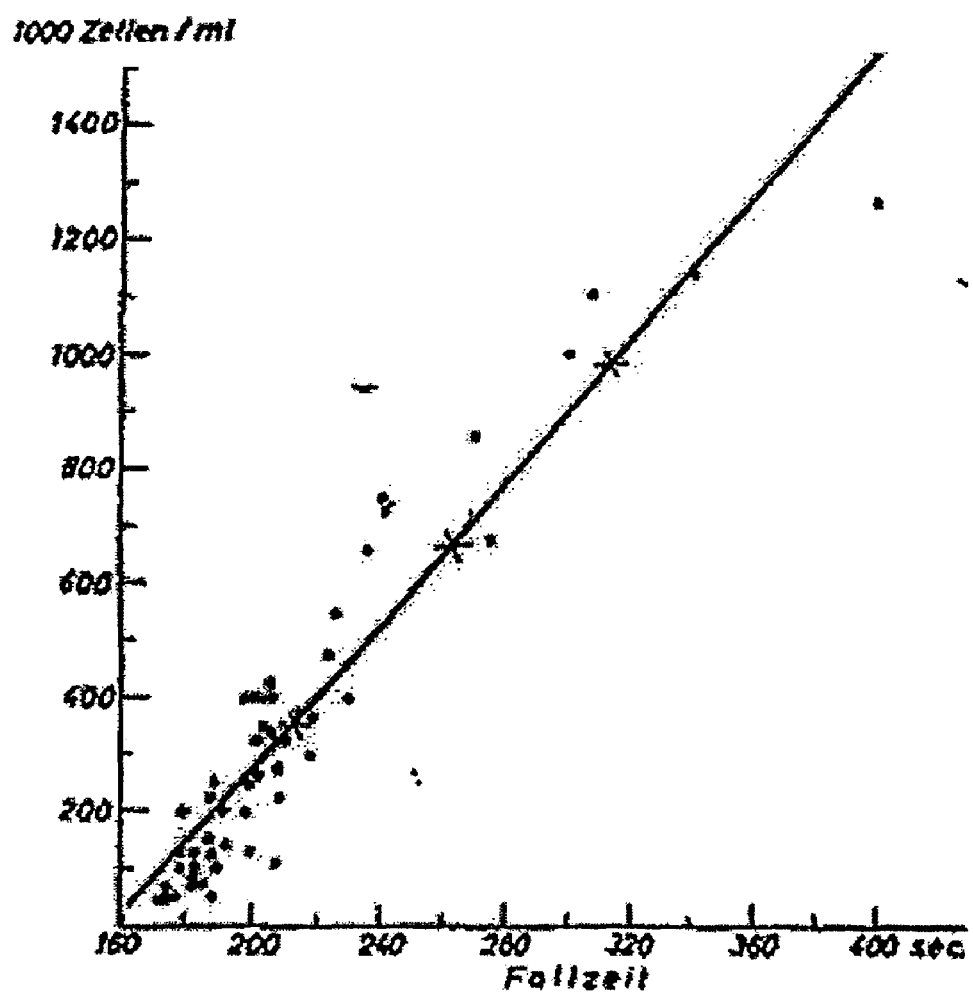
Figure 24: Results showing SCC versus falling ball time[8]

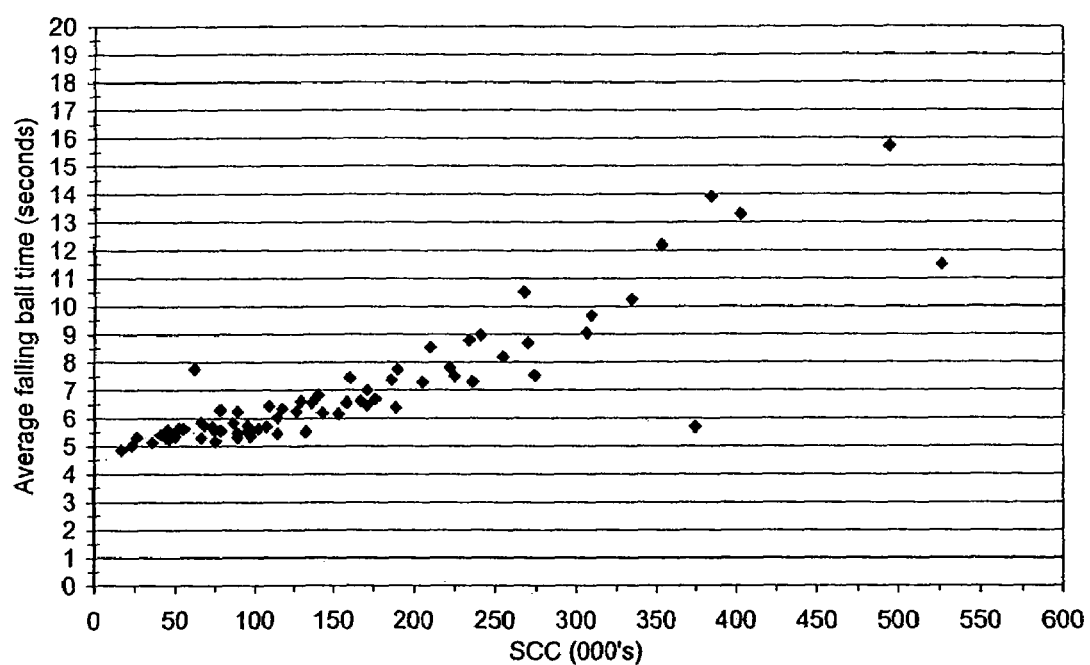
Figure 25: Fall time versus SCC levels for falling ball viscometer.

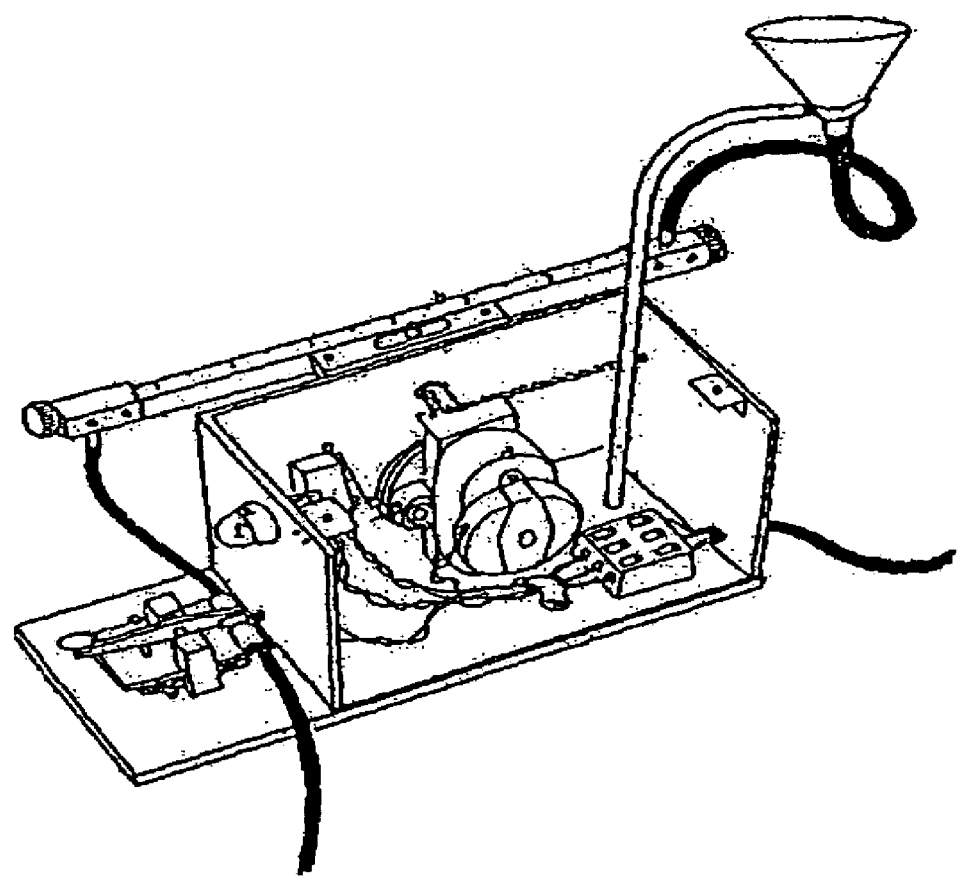
Figure 26: First rolling ball prototype (bottom).

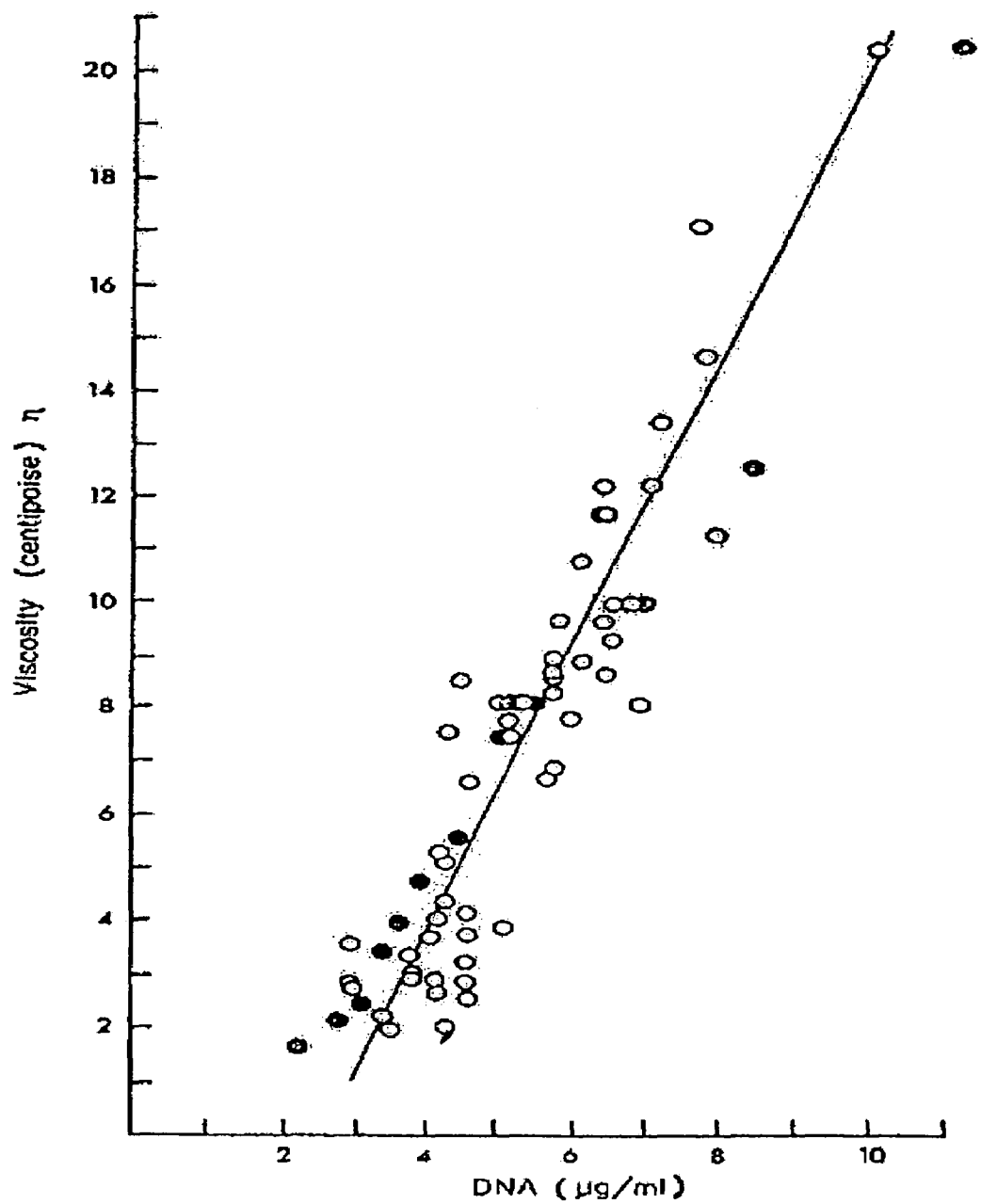
Figure 27: Results from the second falling ball viscometer[1].

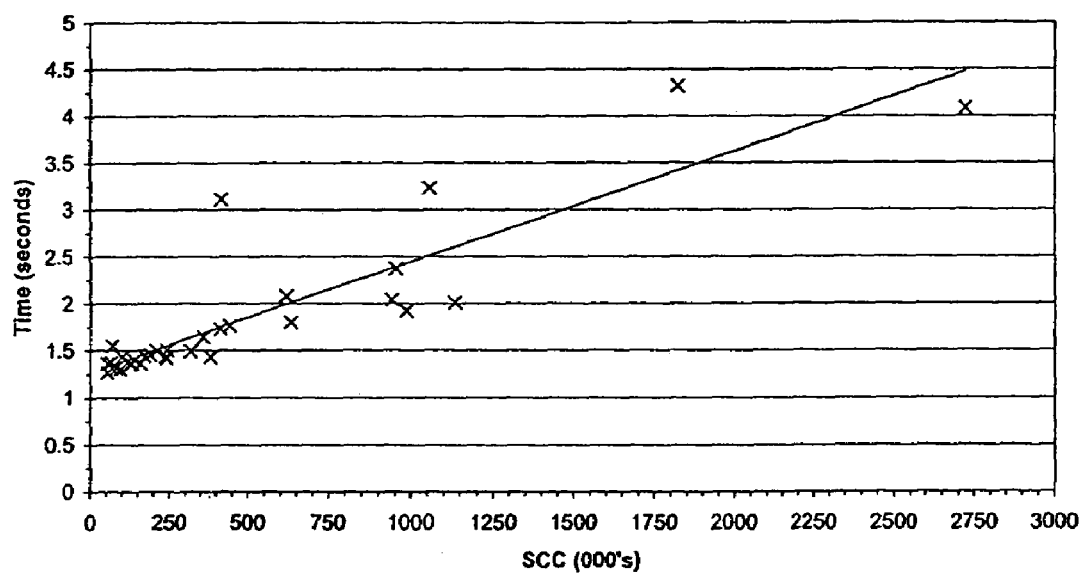
Figure 28: Results from applicant's rolling ball prototype.

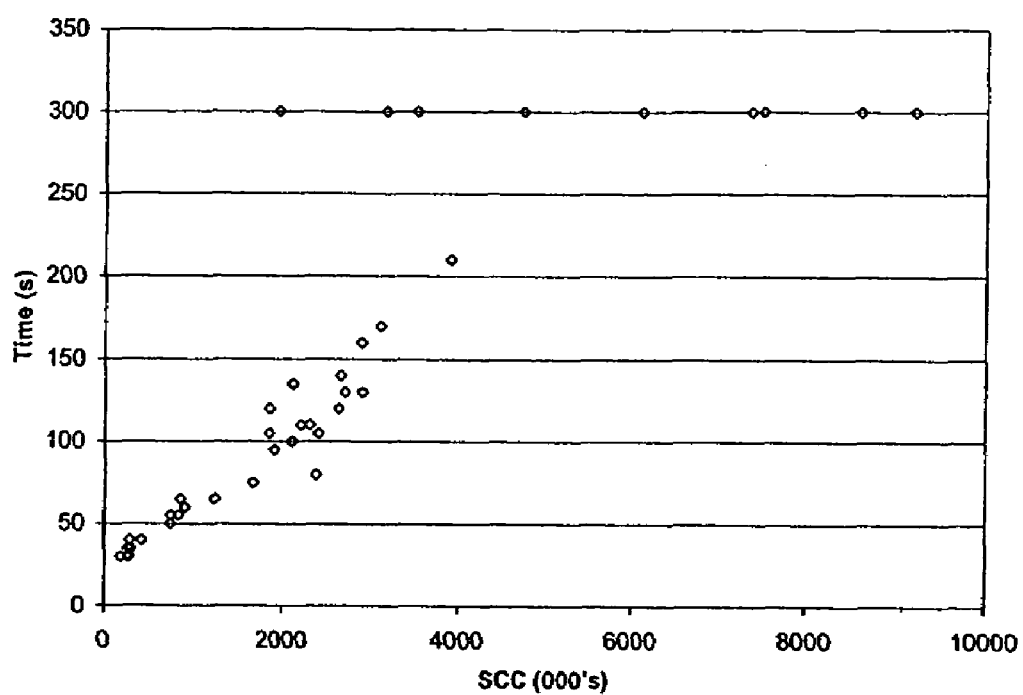
Figure 29: SCC determination with Italian flow cell[2].

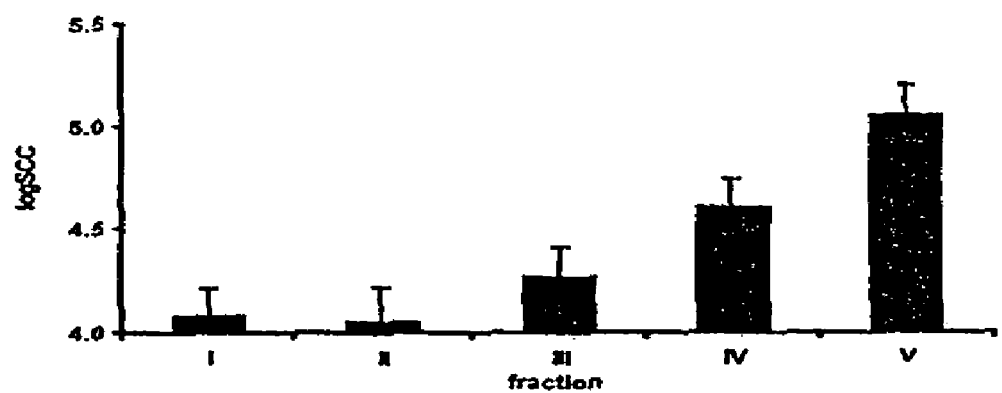
Figure 30: Log SCC levels for: fore milk (I), cisternal milk (II), main milk flow (III), strippings (IV) and residual milk (V), Van Groenweghe et al. (2002)

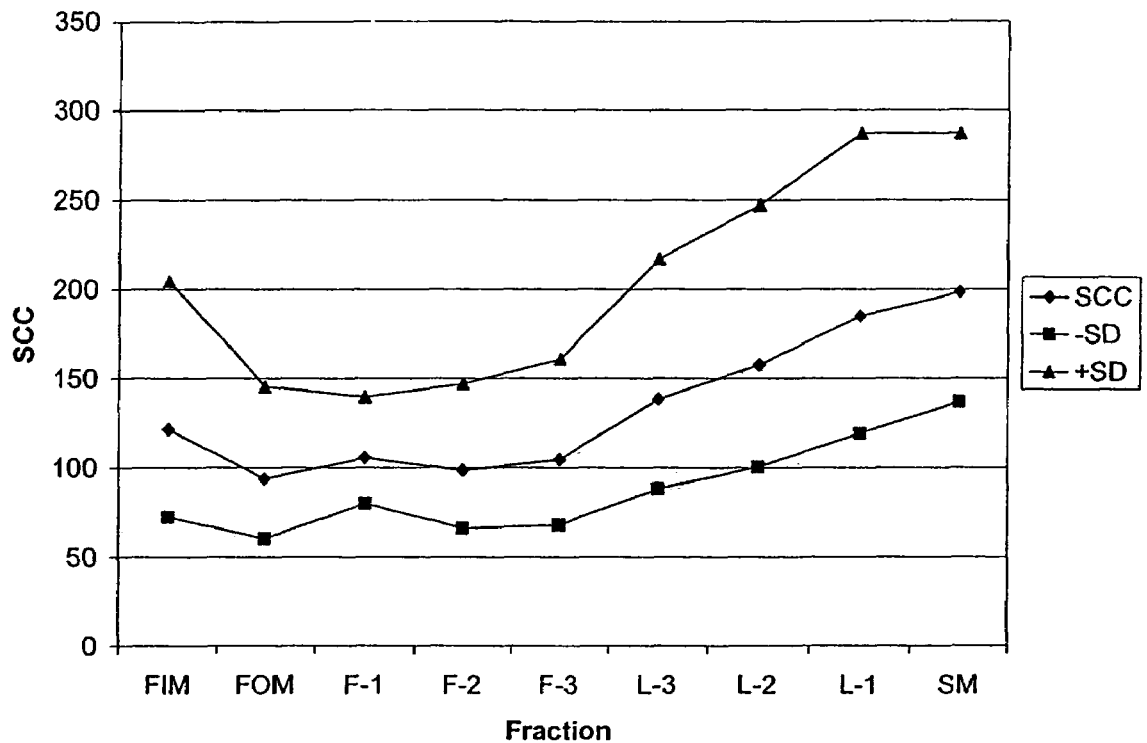
Figure 31: Result of SCC over milking for uninfected cows. First jets (FIM), foremilk (FOM), main milk taking 40ml over 20 seconds (F-1 to L-1), and after machine milking (SM). Hamann and Gyodi (1999)[20]

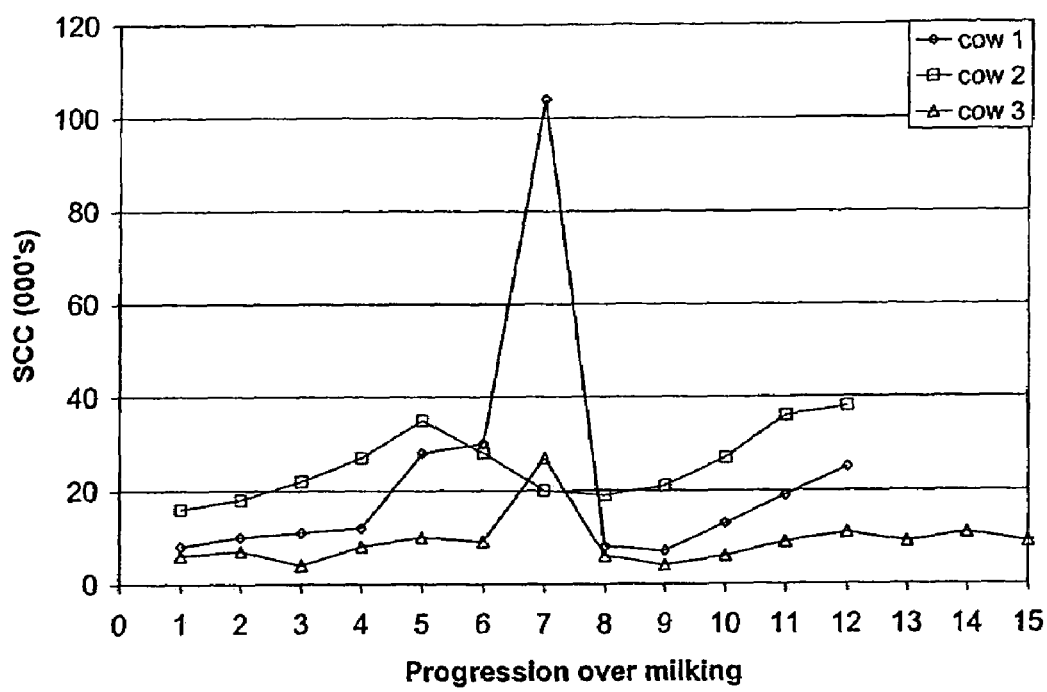
Figure 32: Consecutive samples taken over a milking for three cows (cow 3 data truncated before end of milking), unpublished results, Sensortec Ltd. 2003.

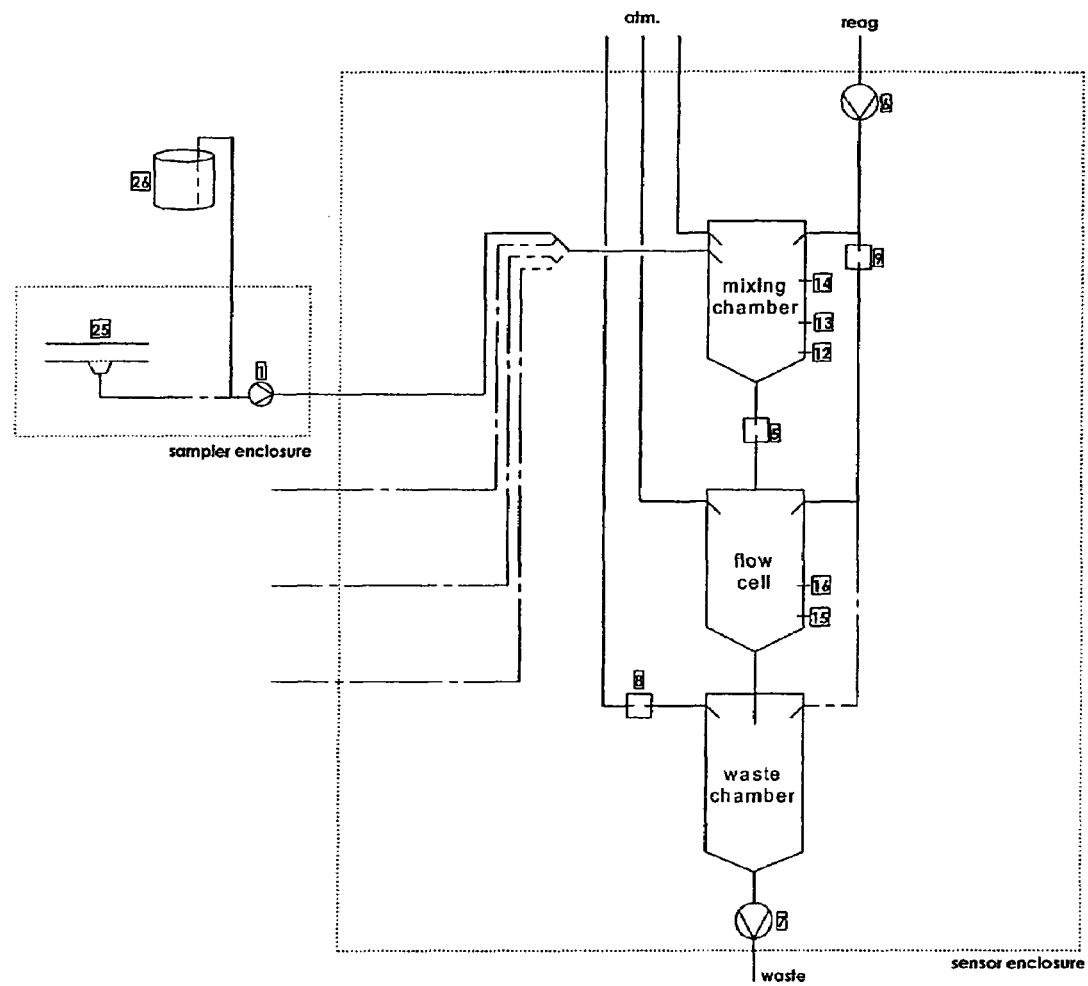
Figure 33: SCC sensor schematics.

MASTITIS DETECTION

CROSS-REFERENCE TO RELATED APPLICATIONS

This application is a continuation in part of application serial number. Ser. No. 10/917,350, filled Aug. 13, 2004, now abandoned which is a continuation in part of application Ser. No. 10/130,733, filed Oct. 8, 2002, now abandoned. The entire contents of these applications are hereby incorporated by reference.

BACKGROUND OF THE INVENTION

1. Field of the Invention

The present invention relates to mastitis detection and to related apparatus, methods and procedures.

The present invention recognises that an advantage is obtained for a farmer where there is the prospect of on-line monitoring of the somatic cell count indicative of mastitis infection in individual animals. Such monitoring either allows a treatment regime to be instituted for the particular animal or animals and/or for the isolation of or recriminations, if appropriate, or in respect of any such affected milk (whether at the milking parlour, farm, factory or elsewhere).

2. Description of the Related Art

Procedures exist whereby a non isolated flow of milk might directly be tested for mastitis. Such procedures have tended to find favour but at the cost of reduced accuracy over isolated milk testing procedures.

*Journal of Dairy Research* (1998) 65 187–198 "Changes in Electrical Conductivity and Somatic Cell Count Between Milk Fractions From Quarters Subclinically Infected with Particular Mastitis Pathogens" M W Woolford et al. discloses that intramammary infection (which seriously reduces milk yields) is frequently associated with increases in electrical conductivity in milk owing to increased levels of sodium and chloride ions in the milk. The monitoring of electrical conductivity can therefore be a means of automatically tracking udder health. Yet Woolford et al states that factors such as temperature, fat concentration, milk solids, bacterial type, and milk fraction have variously been found to influence the measure of electrical conductivity. It is stated that such factors are important since the increase in electrical conductivity induced by intramammary infection is typically in the range of 15% to 50% only whereas the increase in somatic cell count (SCC) is usually at least 1000% increase. Moreover Woolford et al states there are substantial physiological variations in the normal electrical conductivity levels that preclude comparisons of absolute milk electrical conductivity levels amongst cows for the purposes of identifying infection.

Examples of procedures and related apparatus that have been developed reliant on electrical conductivity to test milk flows include EP0748156 of Gasgoine-Melotte B.V. and PCT/SE97/00671 (published as WO97/40374) of Alfa Laval Agri AB.

The full content of such Woolford et al publication and specifications EP0748156 and WO97/40374 are hereby here included by way of reference.

Gasgoine-Melotte BV in their EPO 748156 comment on two sampling procedures so that still milk can be tested for conductance. They refer inter alia to EP-B-137367.

The Woolford et al publication in addition makes reference to somatic cell count (SCC) as a diagnostic criteria by indicating that, for example, greater than 500,000 cells/ml might be indicative of infection whilst less than 500,000 cells/ml may be indicative of no infection.

TABLE 1

(from Woolford et al) Diagnostic criteria for electrical conductivity, within-cow electrical conductivity ratio and somatic cell count used for prediction of the infection status of individual quarters.

| Predicted quarters status | Required diagnostic criteria | |
| --- | --- | --- |
| | Conductivity | Somatic cell count, cells/ml |
| Infected | ECR > 1.15 or EC > 7000 µS | >500000 |
| Uninfected | ECR < 1.5 | <500000 | where EC is electrical conductivity and ECR is electrical conductivity ratio.

Woolford et al indicates that reliance on somatic cell count (SCC) using a criteria based on 500,000 cells/ml provided greater sensitivity than did the electrical conductivity measures.

Test procedures for mastitis for manually isolated milk are known where the milk that is tested is not subsequently returned to the main volume of the milk.

One type of such isolated milk testing regime is a cow-side gel forming mastitis test procedure. This is typified by the Rapid Mastitis Test (RMT) [or California Mastitis Test (CMT)]. See "*Journal of American Veterinary Medical Association*, Vol 130, Mar. 1, 1957—No. 5—"Experiments and Observations Leading to Development of the California Mastitis Test" of O. W. Schalm and D. O. Noorlander.

The CMT procedure utilises an anionic surfactant (e.g. a detergent such as, for example, sodium lauryl sulphate commonly marketed at TEEPOL™). The CMT procedure results in a precipitate or gel indicative of the degree of infection (i.e. the SCC).

*Australian Journal of Dairy Technology* 23, 129 (1968) E A Kernohan has shown that accuracy of somatic cell count (SCC) reliant upon the CMT procedure is dependant on the relative amounts of milk and reagent utilised. For best results preferably a near one to one volume ratio of a suitable reagent to milk is used in equal volumes for best results [for example, 2% w/v sodium laurel sulphate (commonly marketed as TEEPOL™) in water used in equal volume with milk].

Historically the CMT procedure of Schalm and Noorlander was graded on a score outlined below.

This score corresponds to SCC (Milchwissenschaft 19, 65–69 (1964) Halbquantitative Ausarbeitung des Schalmtestes für wissenschaftliche Zwecke of Keirmeier and Keis). The measurement technique used an "eyeball" technique. Therefore some variation exists in interpretation:

(−) negative, remains liquid, (T) trace, slight precipitate which tends to disappear with more movement, >116 000 cells/ml (+) weak positive, precipitate but not gel formation, >315 000 cells/ml (++) distinct positive, thickness immediately with some gel formation, >600 000 cells/ml (+++) strong positive, distinct gel formation adherence to bottom of paddle and during swirling peaks forms >1 000 000 cells/ml

*The Journal of Milk and Food Technology* 27, 271–275 (1964)—"The Wisconsin Mastitis Test—An Indirect Estimation of Leucocytes in Milk" of Thompson and Postle discloses the Wisconsin Mastitis Test (WMT). In the WMT the milk and detergent were mixed in a tube. The tube was then inverted and a small hole in the top (3/64 inch diameter) allows the watery part to drain out. The height of the residual was then measured after at least a 1 min inversion This is still in use in some small laboratories today with an active SCC range from 100 000 to 1.2 million cells/ml.

This test was then investigated in the mid 1970s (Milchwissenschaft 27 (2) 1972 "A simple semi-automatic viscosimeter for the estimation of somatic cells in milk", Whittlestone et al., and Milne et al., 1976) to try and automate the testing for use in the laboratory.

It was found that some ways of measuring the viscosity of the gel destroyed the gel. Ultimately a rolling ball viscometer where the time for a ball to roll through the gel was timed. This eliminated errors due to gel destruction. The active SCC ranges were 250 000–2 million cells/ml (Whittlestone et al.) and 100 000–1.3 million cells/ml (Milne et al.) respectively. This was also undertaken in Germany (Kiermier and Keis 1964).

See also the publications:
  *The Australian Journal of Dairy Technology*, 21, 138–139, (1966) "An Automatic Viscometer for the Measurement of the California Mastitis Reaction" Whittlestone et al;
  *Journal of Milk & Food Technology* 33, 35–354 (19 . . . ) "A Viscometric Method for the Estimation of Milk Cell court" Whittlestone et al;
  Milchwissenschaft 27, (2) 84–86 (1972) "A Simple Semi-automatic Visosimeter for the estimation of somatic cells in Milk" Whittlestone et al and
  *New Zealand Journal of Dairy Science and Technology*, 11, 21–23 (1976) Milne et al
  each discuss procedures for measuring the viscosity of the gels of such prior art detergent/milk SCC procedures with a view to determining a viable measurement regime.

Procedures disclosed include orifice or capillary viscometers (ie; moving gel) as well as falling ball or rolling ball viscometers (ie; stationary gel).

Milne et al standardised a Whittlestone et al type rolling ball viscometer to a tilt angle of 25° in preference to less accurate falling ball viscometers as even very gentle shear forces were found to cause a significant decrease in viscosity. Milne et al found about a 3.5 sec tilt time resulted at that 25° tilt angle when they used a ball of 4.7 mm diameter in a tube of 5.5 mm I.D in a gel made using 2% w/v TEEPOL 610™ (Shell Chemical Company) in water solution as the reagent in volume ratios of 10 ml of the reagent to 5 ml of milk.

The present invention recognises a particular accuracy and convenience is available for any such monitoring regime reliant upon the gelling of a milk sample using an appropriate anionic surfactant and thereafter to test the viscosity by appropriate means to thereby (by reference to some calibration of sample viscosity against the extent of mastitis infection and/or somatic cell count) to provide an indicator representation or record for the particular sample and thus the particular animal.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is therefore an object of the present invention to provide apparatus, methods and systems appropriate to the end of enabling on-line monitoring of milk from animals being milked or at least to allow the automatic or semi automatic testing of milk sampled from a milk volume (preferably a milk flow).

BRIEF SUMMARY OF THE INVENTION

In a first aspect the present invention consists in a method of automatically testing a milk flow for mastitis, said method comprising:
  diverting a sample flow from said milk flow to obtain a sample,
  admixing a sufficient amount of anionic detergent, to cause the viscosity of said milk to increase, with said diverted milk to form an admixture,
  subjecting said admixture to a further treatment to further increase said viscosity, and
  thereafter testing such diverted milk flow for mastitis by measuring at least part of the further treated admixture for an attribute of somatic cell(s) contained therein.

Preferably, the further treatment comprises a second mixing step.

Preferably, the second mixing step is carried out for a predetermined period of time.

Preferably, the second mixing step comprises flowing said admixture to a dwell zone prior to testing said admixture in a testing zone.

Preferably, the admixture can outflow only at a lesser rate than an inflow of the admixture to the dwell zone.

Preferably, said attribute is of the DNA of the somatic cells.

Preferably, the testing is by measuring by reference to a viscosity of the milk under the action of an anionic detergent, such viscosity being dependent upon at least part of the DNA of somatic cells.

Preferably, said measurement is by reliance upon the viscosity of at least part of the milk of that sample when in a predetermined admixture for a predetermined time with an appropriate predetermined anionic detergent such as to enable the viscosity indicator to be comparable with previous and/or subsequent testing to enable changes in somatic cell count to be determined between the milk flows to be compared.

Preferably, viscosity of the admixture is determined by measuring its movement in the testing zone under gravitational forces.

Preferably, the time taken for the admixture to move, under gravitational forces, from a first testing zone level to a second testing zone level, is measured by at least one sensor.

Preferably, testing said milk sample by determining the viscosity of the admixture and comparing the viscosity of said admixture with viscosity results of previous or subsequent testing of milk having a known propensity for mastitis.

Preferably, said milk flow is from a single animal and an identifier of that animal and an indicator of viscosity and thus of the somatic cell count is coupled for comparative purposes.

Preferably, the testing zone is evacuated of admixture prior to then testing a further admixture of milk sample and an anionic detergent.

Preferably, determination of whether there is a somatic cell count change between milkings in milk of an animal further comprises:

from one milking
- diverting a sample flow from the milk flow from the animal, and
- testing such diverted milk flow for somatic cells by measuring an attribute of any somatic cells in at least part of the formed admixture, and in another milking,
- diverting a similar sample flow from the milk flow from the animal, and
- similarly testing such diverted milk flow for somatic cells by measuring the same said attribute of any somatic cells in at least part of the formed admixture, and
- comparing data resulting from said testings to determine any somatic cell count change.

Preferably, said attribute is of the DNA of the somatic cells.

Preferably, the measuring is by reference to the viscosity of the milk under the action of an anionic detergent, such viscosity being dependent upon at least part of the DNA of somatic cells.

Preferably, each said measurement is by reliance upon the viscosity of at least part of the milk of that sample when in a predetermined admixture for a predetermined time with an appropriate predetermined anionic detergent such as to enable the viscosity indicated between the testings to be comparable thereby to enable the changes in somatic cell count to be qualitatively and/or quantitatively determined between the milkings.

Preferably, said automatic testing is of stationary milk.

Alternatively, said automatic testing is of a milk flow whilst the milk moves.

Preferably, the forming of the admixture is provided by an inflow of an anionic detergent and an inflow of said milk sample in predetermined proportions into the mixing chamber to form an admixture.

Preferably, a dwell zone from whence the detergent/milk admixture as a gelling and/or gelled product can outflow only at a lesser rate than said inflow(s), and then feeding the outflow admixture product of said dwell zone to a viscosity testing zone.

Preferably, testing in said testing zone the outflow admixture for viscosity and generating an output signal indicative of such viscosity, and if necessary, clearing (i) the testing zone or (ii) the viscosity testing zone and said dwell zone of said admixture without feedback into the milk flow from which the sample flow was diverted.

Preferably, said inflows are not mixed prior to said mixing chamber or said second mixing step.

Preferably, said milk flow is the milk from at least one teat of a known animal, such animal being identified by an output signal from an animal identifying sensor.

Preferably, a receiver receives the output signal indicative of viscosity and associates such output signal with the animal by reference to either an input signal or a said animal identifying sensor output signal.

Preferably, the data received by said receiver is stored for comparative purposes with subsequent data received at subsequent milkings from the same animal.

Preferably, said sample flow is drawn off a milk flow during milking, such draw off being substantially identical for each milking having regard to
- commencement of milking generated milk flow,
- duration or volume of draw off, and/or
- elapsed milk flow.

Preferably, said inflow of said milk sample and/or said inflow of anionic detergent is a pumped inflow.

Preferably, said inflow of said milk sample and/or anionic detergent is one of
- i) an inflow under gravity (metered or unmetered)
- ii) a pumped inflow (metered or unmetered), or
- iii) both (i) and (ii).

Preferably, the testing in said testing zone of the admixture is whilst the admixture is stationary.

Preferably, a rolling ball test for viscosity is utilised which generates an output signal indicative of such viscosity, such output signal being an elapsed time or a function of an elapsed time.

Preferably, a vacuum recocking of the ball in the rolling ball test for a subsequent viscosity test along with the emptying of the already tested admixture product from said testing zone or said testing zone and said dwell zone.

Alternatively, said viscosity testing zone involves an outflow dependent viscosity testing device or zone without moving parts.

Preferably, said dwell zone and said testing zone are a common chamber of apparatus into which said admixture is provided.

Preferably, the mixing chamber, dwell zone and testing zone are self clearing during and/or after the viscosity testing.

Preferably, the clearing involves a valved outflow.

Preferably, the clearing involves a pumped outflow.

Preferably, there is a clearing step and the clearing involves an application of a vacuum source to at least the testing zone.

Preferably, no flushing fluid other than drawn in air is utilised in said clearing step.

Preferably, said method further comprises (and in any workable order):
- diverting a sample from a said milk flow from an animal,
- providing an animal identifier input or signal capable of identifying said animal to data acquisition, analysis and storage means;
- providing an inflow of an anionic detergent and an inflow of said milk sample in predetermined proportions into a dwell zone to allow at least partial gelling of the mixture,
- providing an outflow of the at least partially gelled mixture of said dwell zone to and/or through and/or using a viscosity testing zone and (immediately or subsequently) generating an output signal to said data acquisition, analysis and storage means indicative of the viscosity of a predetermined part of the mixture that has been subject to a predetermined gel forming dwell time post mixing (whether prior to, during or post said inflow(s)), and
- if necessary, clearing (i) the viscosity testing zone or (ii) the viscosity testing zone and said dwell zone of said mixture without feedback into the milk flow from which the sample was diverted.

Preferably, the data received by said acquisition, analysis and storage means is stored for comparative purposes with subsequent data received at subsequent milkings from the same animal.

Preferably, said milk flow results from milking an animal.

Preferably, said sample flow is drawn off a milk flow during milking, such draw off being substantially identical for each milking having regard to:

commencement of milking generated milk flow duration or volume of draw off, and/or elapsed milk flow.

Preferably the testing in said viscosity testing zone of the outflow admixture product for viscosity is whilst the at least partly gelled product is stationary.

Preferably, a rolling ball test for viscosity is utilised which generates said output signal indicative of such viscosity, such output signal being an elapsed time or a function of an elapsed time.

Preferably, there is a vacuum "recocking" of the ball for a subsequent viscosity test along with the emptying of the already tested admixture product from said viscosity testing zone or said viscosity testing zone and said dwell zone.

Preferably, said inflow of anionic detergent is a pumped inflow.

Preferably, said inflow of said milk sample is one of (i) an inflow under gravity (metered or unmetered), (ii) a pumped inflow (metered or unmetered), or (iii) both (i) and (ii).

Preferably, said inflow of said milk flow and said inflow of said anionic detergent are a pumped inflows.

Preferably there is a clearing step and the clearing involves an application of a vacuum source to at least the viscosity testing zone.

Preferably, no flushing fluid other than drawn in air is utilised to clear materials.

Preferably, (despite the embodiment of the inventive method being used) said predetermined proportions are in the volume ratios of 5:1 to 1:5.

Preferably, said predetermined proportions are in the range of from 2:1 to 1:2 inclusive.

Preferably, said predetermined proportions are substantially in the ratio 1:1.

Preferably, said anionic detergent is a Gardinol Type Detergent as defined in the Merck Index.

Preferably, said anionic detergent is an aqueous solution of about 2% w/v sodium laurel sulphate.

Preferably, the procedure is fully automatic once initiated.

Preferably, the somatic cell count data and/or comparisons are generated.

In a further aspect the invention comprises a method of testing an animal for mastitis by on-line testing of milk from such an individual animal as it is being milked, such testing being reliant upon an automated surfactant gelling of an automatically diverted sample from the milk flow in a predetermined and reproducible manner and the automated measurement of the viscosity or some function of viscosity thereof thereby to generate data from which somatic cell count can be assessed or compared.

In a still further aspect the invention comprises an automatic apparatus for testing a milk flow for mastitis, the apparatus comprising:

a diverter adapted to divert part of the milk flow as a sample, a mixing chamber adapted to receive and mix said sample with an anionic detergent, thus forming an admixture having a viscosity, further treatment means adapted to subject said admixture to a further treatment for a time sufficient to further increase said viscosity, and testing means which measures at least part of the formed increased viscosity admixture for an attribute of somatic cell(s) contained in said admixture.

Preferably, said further treatment means comprises a mixer which carries out a second mixing of said admixture.

Preferably, a dwell zone is provided and adapted to receive said admixture in a flow, thereby carrying out said second mixing.

Preferably, the milk flow is from an individual animal from at least one cup of a milking claw, the sample delivered to any accumulation reservoir or conduit for such flow, the apparatus further comprising:

means to generate a signal or representation or record indicative of the test result insofar as mastitis or somatic cell count is concerned for the milk sample taken into said apparatus.

Preferably, means are provided whereby all steps proceed automatically once initiated by an operator during preparation for milking or during milking.

Preferably, said apparatus includes means to mix an appropriate anionic detergent with the milk sample thereby to generate an admixture with a viscosity indicative of somatic cell count, and means to test the admixture thus generated for viscosity and means to cause or allow the gel to clear from the apparatus.

Preferably, said apparatus is such that an identical testing regime is followed for each sample taken from the milk flow such that for an individual animal or as between individual animals, or both, there is a comparative basis.

Preferably, there is provided data acquisition, analysis and storage means and there is provided means to provide an animal identifier input or signal capable of identifying an animal being milked to said data acquisition, analysis and storage means and said means to generate a signal or representation or record itself provides an output signal to said data acquisition, analysis and storage means indicative of the viscosity of the admixture in the apparatus for tying to the animal identified.

Preferably, said apparatus includes a rolling ball type viscosity tester capable of generating an output signal reliant on an elapsed time or a function of elapsed time.

Preferably, said testing means is reliant upon the mixing of an anionic detergent with the sample and thereafter obtaining some measure of the viscosity of the admixture.

Preferably, said apparatus is for or suitable for determining whether or not there is a somatic cell count change between milkings in milk of an animal, and further comprises:

from one milking,
means for diverting a sample from the milk flow from the animal, and
means for automatically testing such diverted milk flow for somatic cells by
measuring an attribute of any somatic cells in at least part of the milk of that sample or sample flow, and in another milking,
means for diverting a similar sample flow from the milk flow from the animal, and means for similarly testing such diverted milk flow for somatic cells by measuring the same said attribute of any somatic cells in at least part of the milk of that sample or sample flow, and means for comparing data resulting from said testings to determine any somatic cell count change.

Preferably, in each of said means for testing, the attribute is a viscosity change response arising from the treatment of the milk sample with an anionic detergent.

Preferably, means are also provided that use an appropriate surfactant to generate a gel from the milk sample, means to test the gel thus generated for viscosity or some function of viscosity and means to cause or allow the gel to clear from the apparatus.

In yet another aspect the invention consists in a method of testing an animal for mastitis by on-line testing of milk from such an individual animal as it is being milked, such testing being reliant upon an automated surfactant gelling of an automatically diverted sample from the milk flow in a predetermined and reproducible manner and the automated measurement of the viscosity or some function of viscosity thereof thereby to generate data from whence somatic cell count can be assessed or compared.

In still a further aspect the present invention consists in a milking shed having provision for a testing regime in accordance with any of the earlier aspects stated above.

In another aspect the present invention consists in, in a milk flow path for milk of an individual animal from at least one cup of a milking claw to any accumulation reservoir or conduit for such flow (particularly where the individuality of the milk accumulation or flow is lost), the provision of means to take part of the flow as a sample into apparatus forming at least part of a mastitis testing regime, such apparatus having means that uses an appropriate surfactant to generate a gel from the milk sample capable, means to test the gel thus generated for viscosity and means to cause or allow the gel to clear from the apparatus, and means to generate a signal or representation or record indicative of the test result for the milk sample taken into said apparatus.

Preferably, such apparatus includes or comprises means adapted to merge or mix a non-anionic surfactant with the milk sample taken into the apparatus so as to generate a gel, and means thereafter, by reference to the viscosity of the gel, to generate an indicator dependent on the somatic cells in the sample.

Preferably, said apparatus is capable of discharging the gel just tested.

Preferably, said apparatus includes self-flushing means.

In yet another aspect the present invention consists in, in a milk flow path for milk of an individual animal from the cups of a milking claw, the provision of means to take part of the flow as a sample into apparatus forming at least part of a mastitis testing regime, said apparatus having means that uses an appropriate surfactant to generate a gel from the milk sample capable, means to test the gel thus generated for viscosity and means to cause or allow the gel to clear from the apparatus, and means to generate a signal, representation and/or record indicative of the presence of or level of somatic cells in the milk sample, such signal, representation or record having been derived from the apparatus provided measure of viscosity of the gel.

Preferably, reference to "viscosity" and a measure thereof is with respect to some reproducible mechanical interaction with or some reproducible physical characteristic of the gel or of the gel with a surface or surfaces, (e.g. the gel falling through a conduit and being timed in its fall, a mass falling through the gel and being timed in its fall, etc.) capable of providing between samples of different somatic cell count a difference in measured data that either corresponds to such difference or can be calibrated (eg; to a plot or some equation) to provide appropriate relativity.

Preferably, said signal representation or record is preferably associated with an identifier for the animal involved. In this respect preferably means is provided to scan an animal being milked to thereafter correlate such information to the test result for the milk sample to be taken from the milk flow of that animal.

In a further aspect the present invention consists in a method of testing for mastitis in an animal which comprises the use of a regime herein set forth.

In still a further aspect the present invention consists in a method of on-line testing of milk from individual animals in a milking parlour for somatic cells thereby to determine the extent of mastitis in such animals by arranging for an indexed machine testing of a milk sample from each indexed animal, such testing being reliant upon a (preferably automated) surfactant gelling of the sample and the automated measurement of the viscosity thereof.

Preferably, such samples are diverted from the milk flow.

In still a further aspect the present invention consists in apparatus for or suitable for association with the milk line of a milking machine to test milk of an animal being milked for somatic cells thereby testing the animal for mastitis, said apparatus comprising:

means defining a mixing chamber having an ability to receive two liquid feeds, one inlet feed to be an inflow of a sample flow of milk from the milk line, and the other inlet feed to be an inflow of an anionic detergent of a kind that causes a viscosity increase as a result of at least partial gelling of the resultant milk/detergent admixture, and means to provide a measure of and to generate a data output indicative of the viscosity or a function of viscosity of at least part of the resultant milk/detergent fluid calibratable to the somatic cell count of the milk inflow, and wherein there is provision whereby, after said means to provide a measure of and to generate a data output has at least taken a reading indicative of viscosity or a function of viscosity, said milk/detergent fluid can be cleared from the apparatus without contamination of milk in the milk line in order to allow a subsequent milk flow sample to be likewise tested.

In yet a further aspect the present invention consists in apparatus for or suitable for association with the milk line of a milking machine to test milk of an animal being milked for somatic cells (and thus testing the animal being milked for mastitis), said apparatus comprising:

means defining a first chamber having an ability to receive two liquid feeds, one inlet feed to be an inflow of a sample flow of filing from the milk line, and the other inlet feed to be an inflow of an anionic detergent of a kind that will cause a viscosity increase as a result of at least partial gelling of the resultant milk/detergent fluid, means defining a second chamber to receive at least part of the resultant milk/detergent fluid from said first chamber, means to provide a measure indicative of viscosity or a function of viscosity of the resultant milk/detergent fluid in said second chamber calibratable to the somatic cell count of the said sample flow of milk, and means to generate a data output indicative of said measure.

Preferably, said apparatus includes a reservoir for an anionic detergent.

Preferably, said apparatus has means adapted in use to reproducibly control the two inlet feeds.

Preferably, there is provided a measure whereby said admixture can be cleared from the apparatus without contamination of milk in the milk line in order to allow a subsequent milk flow sample to be likewise tested.

In one embodiment a second chamber or testing zone is provided as, or includes, the barrel of a rolling ball viscometer.

Preferably, said the rolling ball viscometer includes spaced sensors.

Alternatively, said means defining a mixing chamber and said means defining a testing zone are interconnected such that a chamber is defined into which there is adapted to be a greater infeed of fluids than outfeed therefrom thereby in use ensuring, at least part of the admixture is measured in the testing zone to provide a measure of somatic cell count.

In still a further aspect the present invention consists in somatic cell count data and/or comparisons thereof.

Reference herein to diversion of or the taking of a sample of milk includes (where the context might allow) milk from one or more teats of the same animal or bulk milk, ie: milk from a number of animals.

SCC data can be used for comparative purposes of for an absolute decision (eg; greater or less than 500 000 cells/mL) for an individual teat, for an animal or for a grouping of animals.

BRIEF DESCRIPTION OF THE DRAWINGS

Preferred forms of the present invention will now be described with reference to the accompanying drawing in which;

FIG. 1 (FIGS. 1A and 1B) shows for the same herd (hereafter referred to as "DRC" herd) the time changes in somatic cell count (SCC) measured in thousands of cells per milliliter with the peaks showing the actual somatic cell count.

FIG. 15 shows an individual anionic molecule (detergent) with negatively charged head and hydrophobic carbon tail on the left, and a detergent micelle formed by detergent in aqueous solutions, hiding the tails from water as much as possible on the right.

FIG. 16 showings detergents form micelles (left) phospholipids form lipid bilayers (middle) and these bilayers curve around to form the outside of a cell, called a cell liposome (right).

FIG. 17 shows a Lysed cell, black blob in middle, releasing its DNA, strands surround it.

FIG. 18 shows an Electron Microscope picture of DNA and associated histones. The "balls" are the histones and the "strands" that connect these together is the DNA.

FIG. 19 is a diagram showing the packing of DNA into a chromosome making it possible to put meters of DNA into a cell.

FIG. 20 is a schematic diagram of how the gel forms.

FIG. 21 is a graph showing results of an experiment showing rheopectic and rheodestructive nature of CMT gel.

FIG. 22 is a diagram showing a simple determination of whether fluid is visco-elastic by rotating a spindle in the fluid and observing the fluids behaviour.

FIG. 23 is a graph showing the results for rotary viscometer.

FIG. 24 is a graph showing the results of SCC verses falling ball time.

FIG. 25 is a graph showing the results of fall time verses SCC levels for a falling ball viscometer.

FIG. 26 is a diagram of the first rolling ball prototype.

FIG. 27 is a graph showing the results from the second falling ball viscometer.

FIG. 28 is a graph showing the results from the applicant's rolling ball prototype.

FIG. 29 is a graph showing the results of SCC determination with Italian flow cell.

FIG. 30 shows Log SCC levels for fore milk (I), cisternal milk (II), main milk flow (III), strippings (IV) and residual milk (V), Van Groenweghe et al (2002).

FIG. 31 is a graph showing the results of SCC over milking for uninfected cows. First jets (FIM), foremilk (FOM), main milk taking 40 ml over 20 seconds (F-1 to L-1), and after machine milking (SM), Hamann and Gyodi (1999).

FIG. 32 is a graph showing consecutive samples taken over a milking for three cows (cow 3 data truncated before end of milking), unpublished results, Sensortec Ltd (2003).

FIG. 33 is a schematic diagram showing the SCC sensor arrangement.

DETAILED DESCRIPTION OF THE PREFERRED EMBODIMENTS

Our invention provides a system on-line preferably in the milking parlour (eg; whether conventional or robotic) preferably using a gel type test. The viscosity of the gel can be measured by standard viscosity measurements (Cole Parmer 1999) [eg; time of air bubble travel, time of draining from container, or other].

Figure 2:
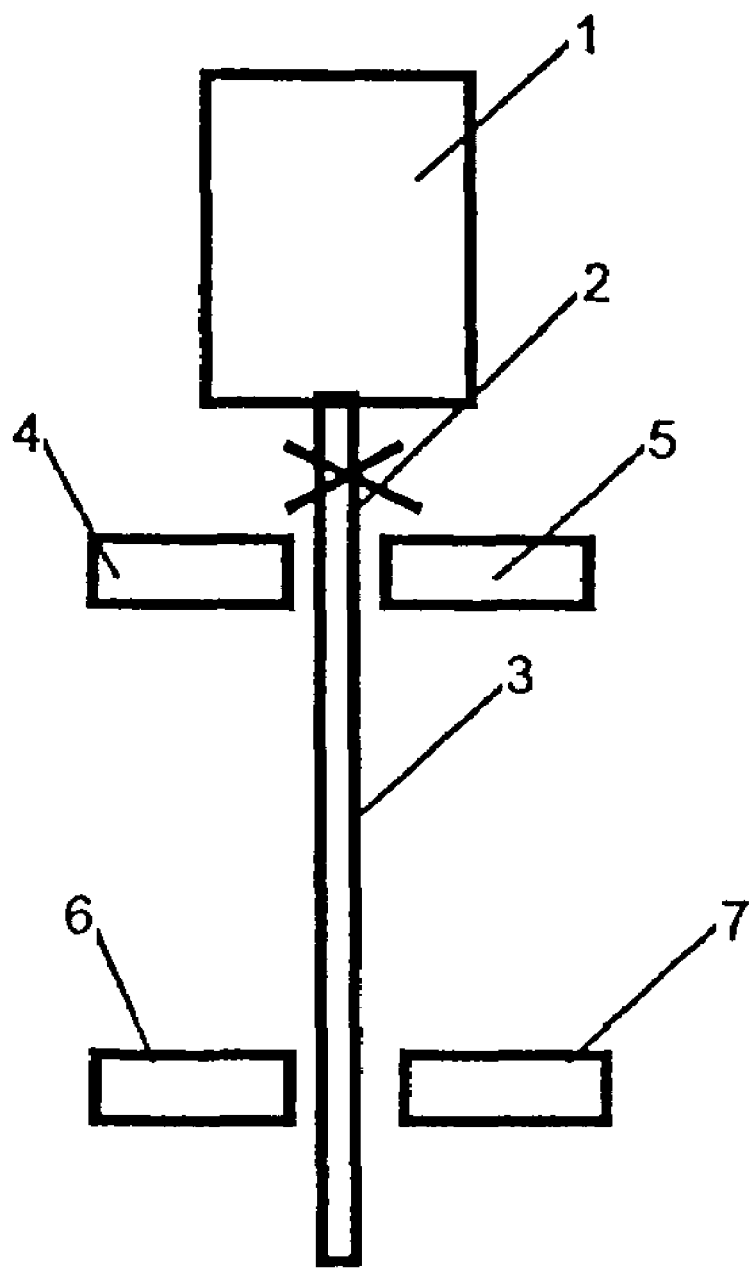
FIG. 2 is a diagrammatic view of apparatus which shows a method whereby a diverted flow can be despatched into a container and thence from a machine controlled valve down a tube or the like (eg; a Gilmont™ Viscometer available from Cole-Parmer International, USA) with the viscosity of the gel formed in the container by appropriate means (not shown) being determined by the time of passage between two zones, (eg; measuring the gel flow commencement interface and gel flow completion interface using a light emitter and detector).

In FIG. 2 a container 1 leads to a drainage tube 3 controlled by a valve 2. In the container 1 there can be a merging or other mixing of a milk sample and sufficient non-anionic detergent to allow a standard gel representative of somatic cell count to be generated. A light emitter 4 or 6 in conjunction with a light detector 5 and 7 respectively determines the commencement of gel flow down the tube 3 and its termination. Such light sensor system if desired can be used in the apparatus of FIGS. 12a to 12g.

Figure 3:
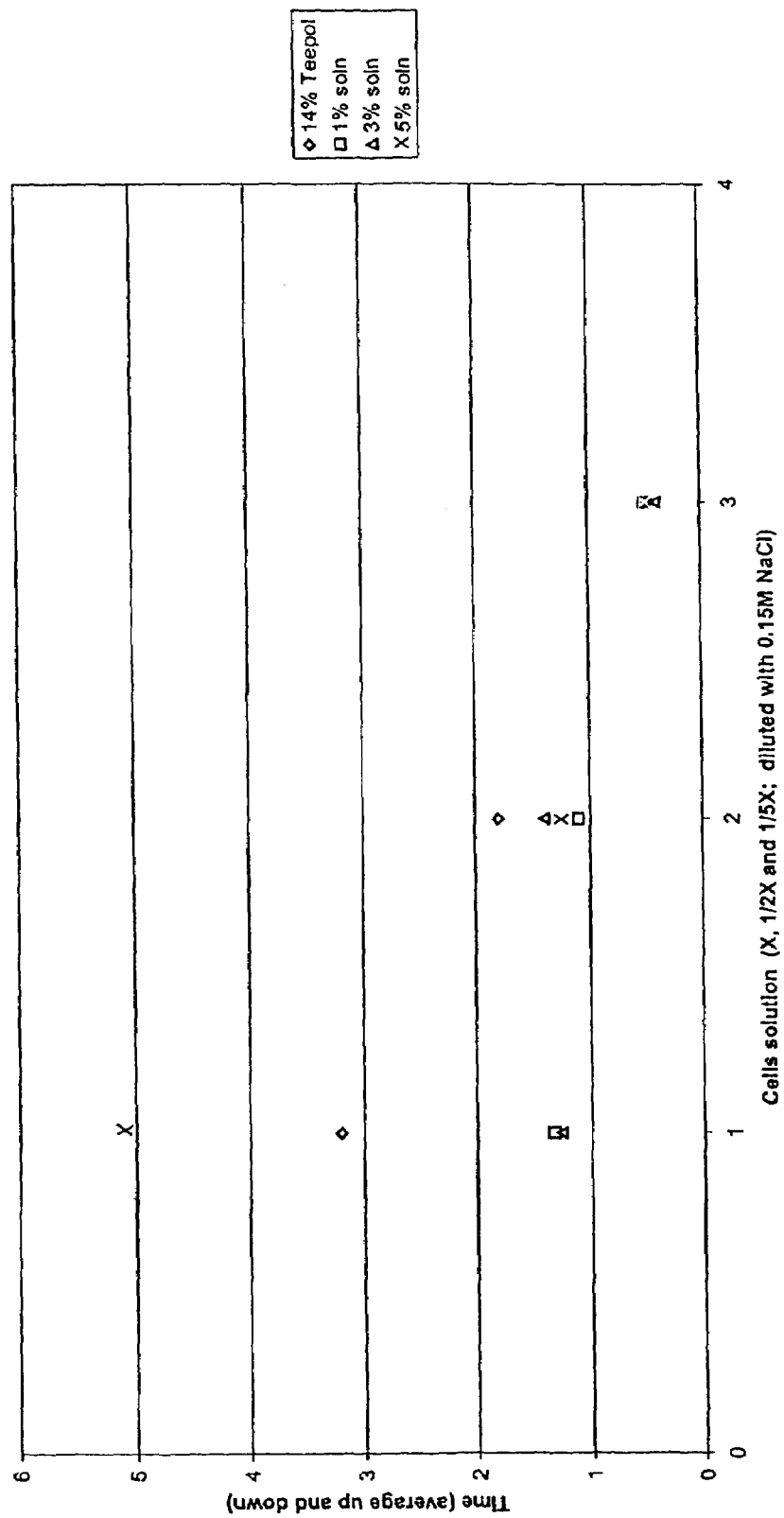
FIG. 3 shows the effect of sodium laurel sulphate concentration in respect of TEEPOL™ (14% w/v) of Shell Chemical Company using stock solution of bovine blood leucocytes.

FIG. 3—This figure was obtained by spinning down blood obtained from the Ruakura research abattoir, with heparin to stop blood clots. It was spun down so that the leukocytes could be extracted without red blood cells. This was then diluted with 0.15M NaCl to produce three solutions. The first solution was between 500 000–1 000 000 cells/ml. The second and third were ½ and ⅕, of the first respectively.

Within 12 hours of blood being harvested it was tested. This was done by adding 4 ml of reagent to 4 ml cell solution in a 12 ml centrifuge tube. When they were mixed a timer started, and the tube inverted once. When the timer reached 20 seconds the solution was poured into the Gilmont viscometer. Before the first sample the viscometer was rinsed once with water. Then the stainless steel ball was added and the cap screwed on. The time taken for the ball to pass between the marks on the tube (10 cm apart) was timed. The viscometer was then inverted and the ball timed between the points again. This was then averaged.

The gel was then tipped out from the viscometer and it was rinsed once with water and the cycle started again.

Figure 4:
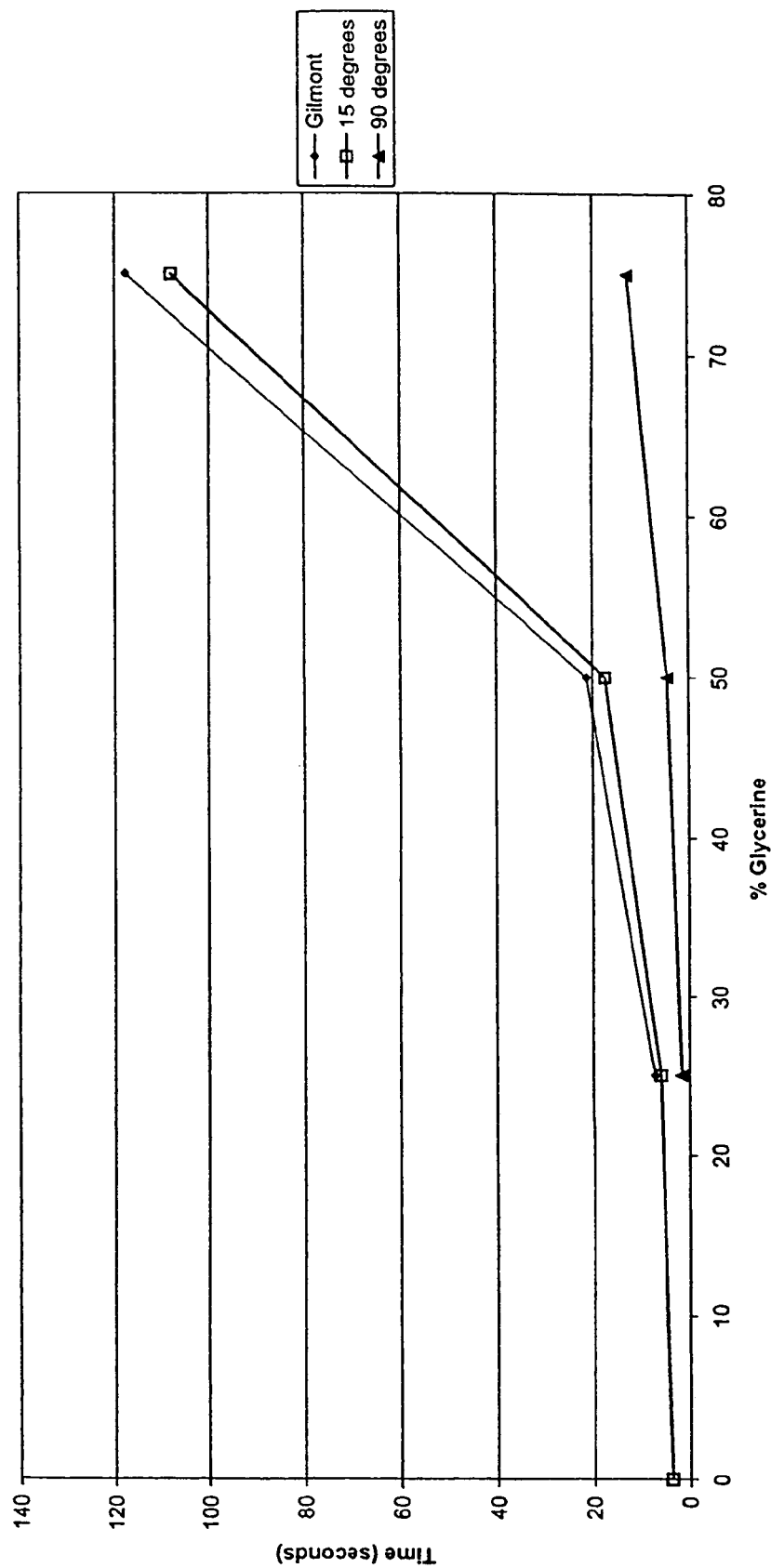
FIG. 4 shows the effect of angle on a rolling ball type viscometer when compared with a Gilmont type falling fall viscometer, ie; which allows the ball to fall vertically (with respect to various aqueous concentrations of glycerine).

FIG. 4—this figure was obtained by using viscosity standards made from glycerine mixed with water. These standards were 0%, 25%, 50% and 75% glycerine in water. These standards were run through the Gilmont viscometer. This result was compared to the viscometer made in the laboratory. This was a 8.4 mm diameter ID tube with a 7.9 mm stainless ball. One result was taken with the viscometer at 90 degrees (i.e. vertical) and the other at 15 degrees from the horizontal.

Figure 5:
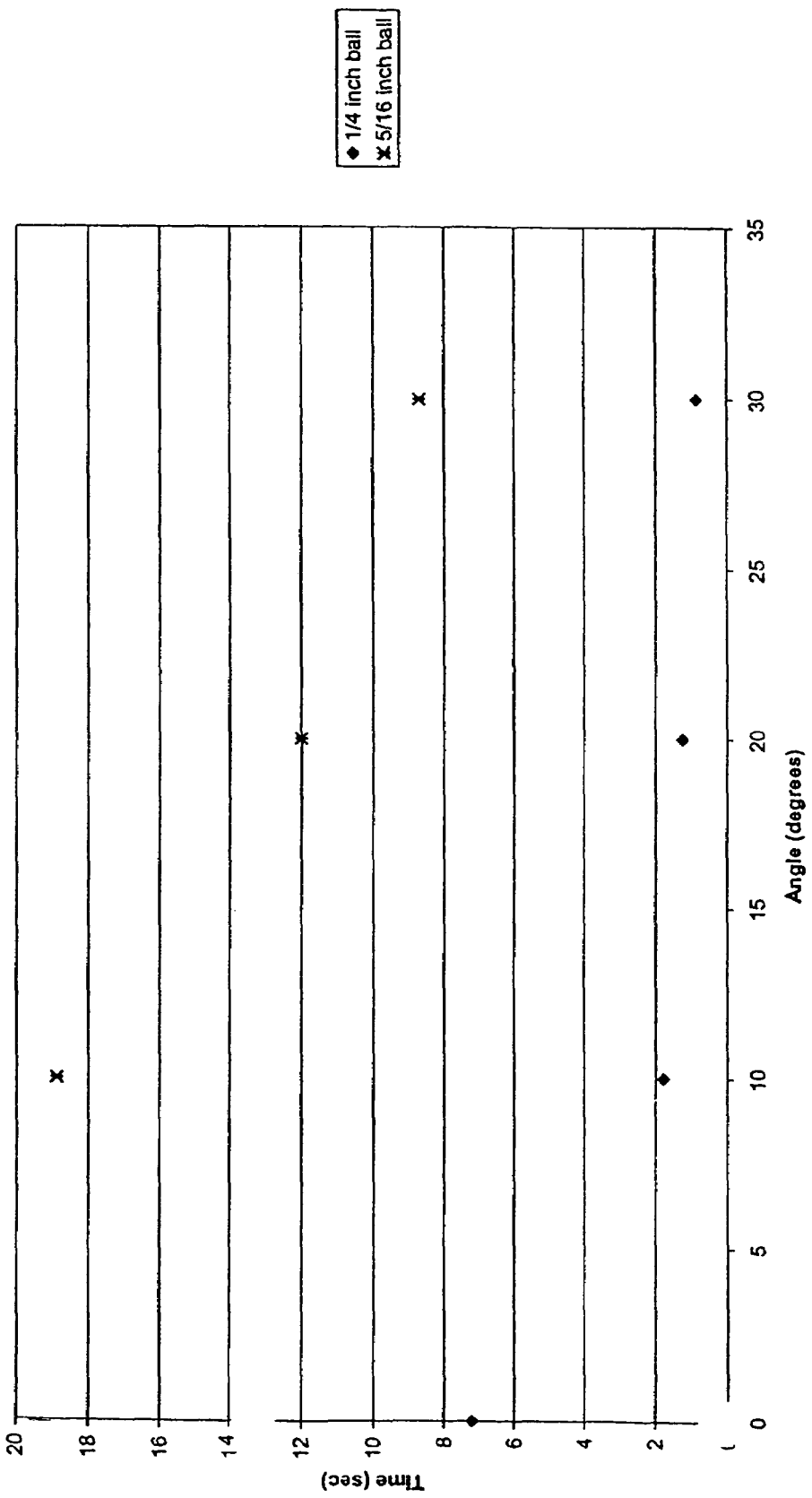
FIG. 5 shows the effect of ball size on the time the ball descends at various angles using 50% glycerine in water as the fluid, the slope of the resultant lines if plotted through the data points being approximately equal.

FIG. 5—this figure was obtained using the viscometer in the laboratory, using the 50% glycerine standards. The angle was varied from the horizontal with two different diameter balls. The 6.4 mm and 7.9 mm balls were stainless and carbon steel respectively. See FIG. 10.

Figure 10:
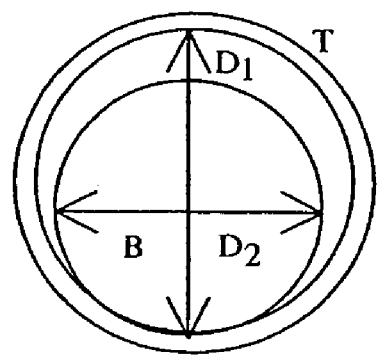
FIG. 10 shows a cross section of a rolling ball tube of rolling ball type viscometer of a kind in respect of which results for a quarter inch and five sixteenth inch balls are plotted in FIG. 5.

FIG. 10 shows a cross section of the tube. The tube T, has an internal diameter $D_1$ and the ball B, has a diameter $D_2$. The difference between the two diameters determines the speed through the liquid. See FIG. 5 for example. As the ball diameters increases it slows the movement down. However if the ball diameter becomes too large the non-homogonous nature of the gel stops the ball from rolling even though it could roll though a standard gel solution. (i.e. glycerine mixed with water).

Figure 6:
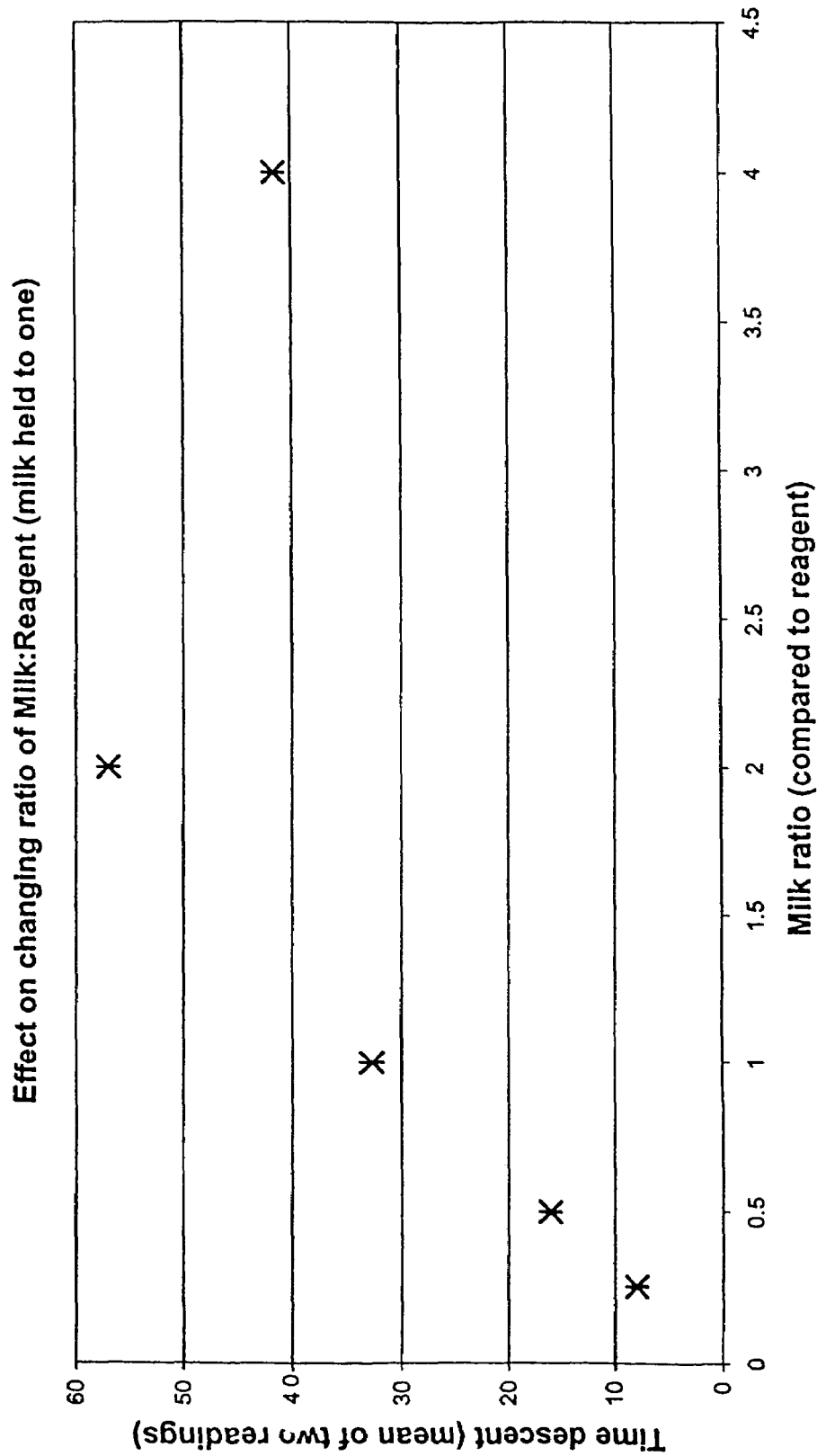
FIG. 6 shows the effect of changing ratio of milk to anionic detergent in water reagent (the milk being held to 1).

FIG. 6—this figure was taken with raw milk from the DRC herd within four hours of harvesting. 14% Teepol™ was used as the reagent. It was mixed with the same milk sample at different ratios using the same procedure as FIG. 3. It was measured in the Gilmont viscometer in the same way as FIG. 3.

Figure 7:
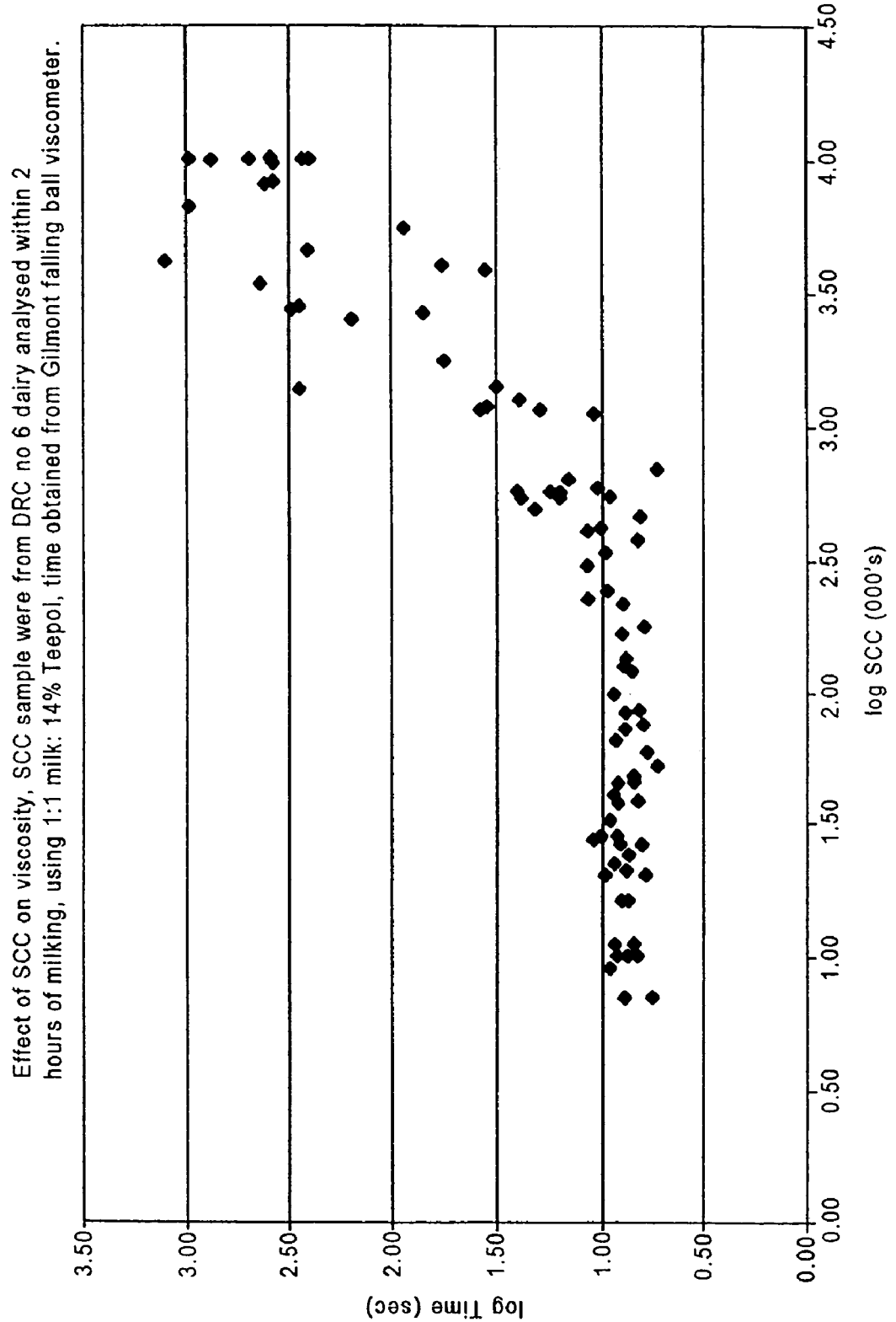
FIG. 7 shows the effect of SCC on viscosity using a 1:1 milk ratio.

FIG. 7—this figure was created by mixing regent, (14% Teepol™), 1:1 with milk before two hours had elapsed since harvest. The tests were done between 15–25 degrees centigrade. Both the mixing and measuring procedure was the same as FIG. 3.

Figure 8:
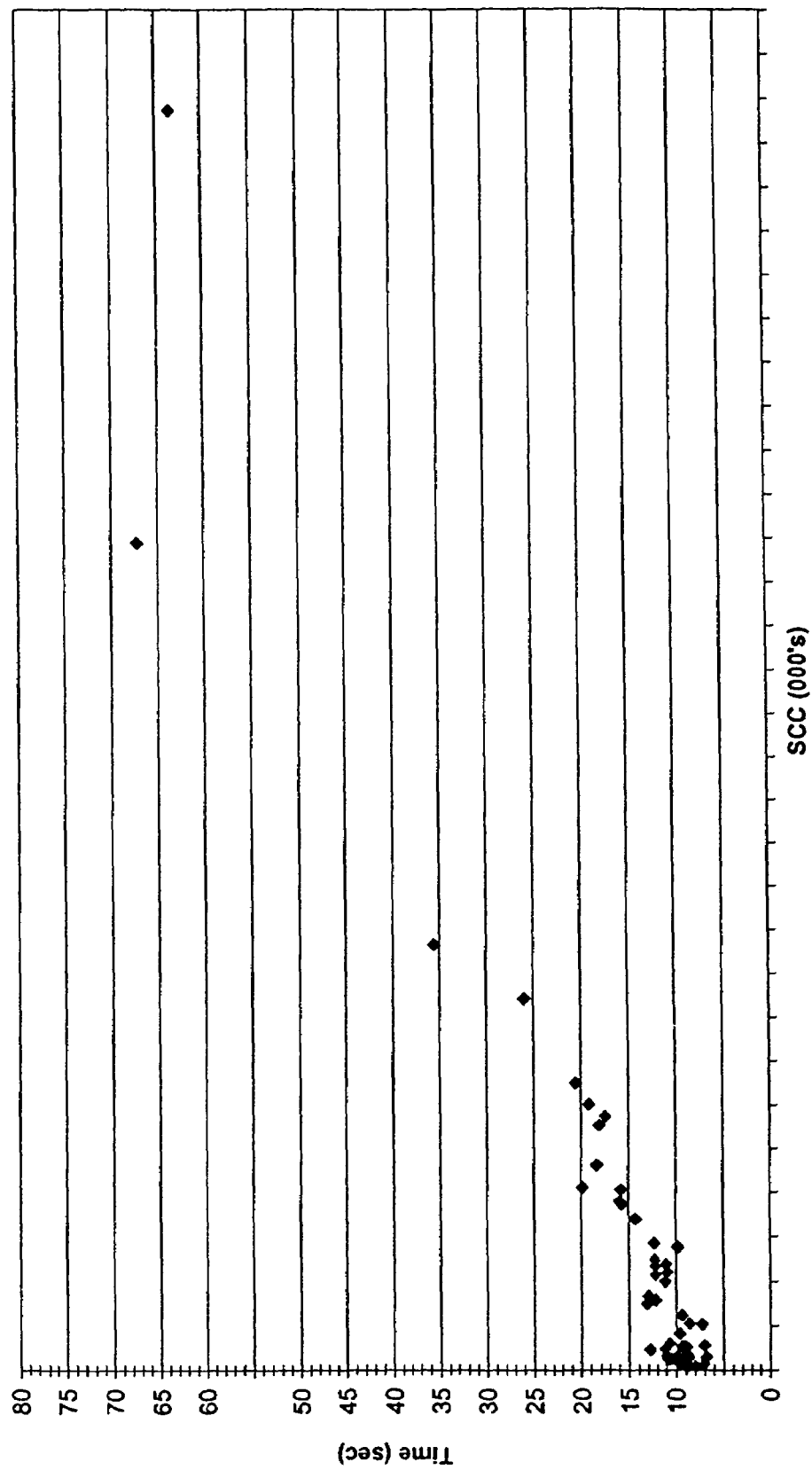
FIG. 8 shows the effect of SCC on viscosity using a 2:1 milk ratio.

FIG. 8—this is exactly same as FIG. 7 except the ratio reagent:milk was 1:2.

Figure 12A:
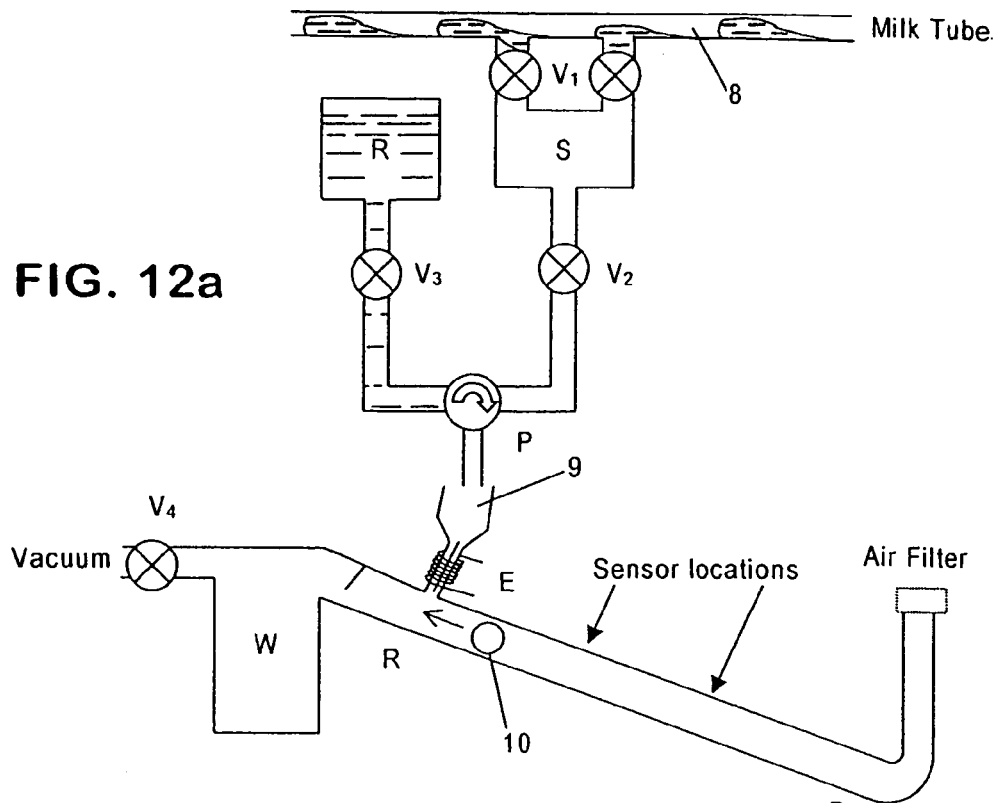
FIGS. 12A through 12G show in respect of a milk tube line or the like apparatus in accordance with the present invention showing diagrammatically various stages of a mastitis testing regime.
Figure 12B:
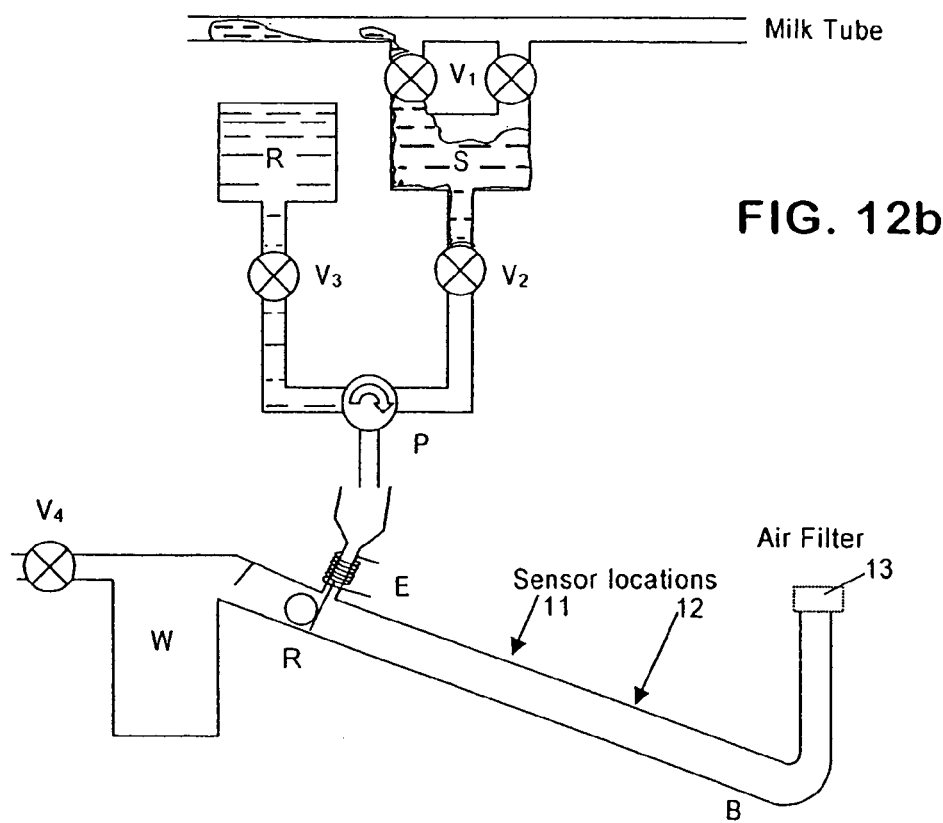
Figure 12C:
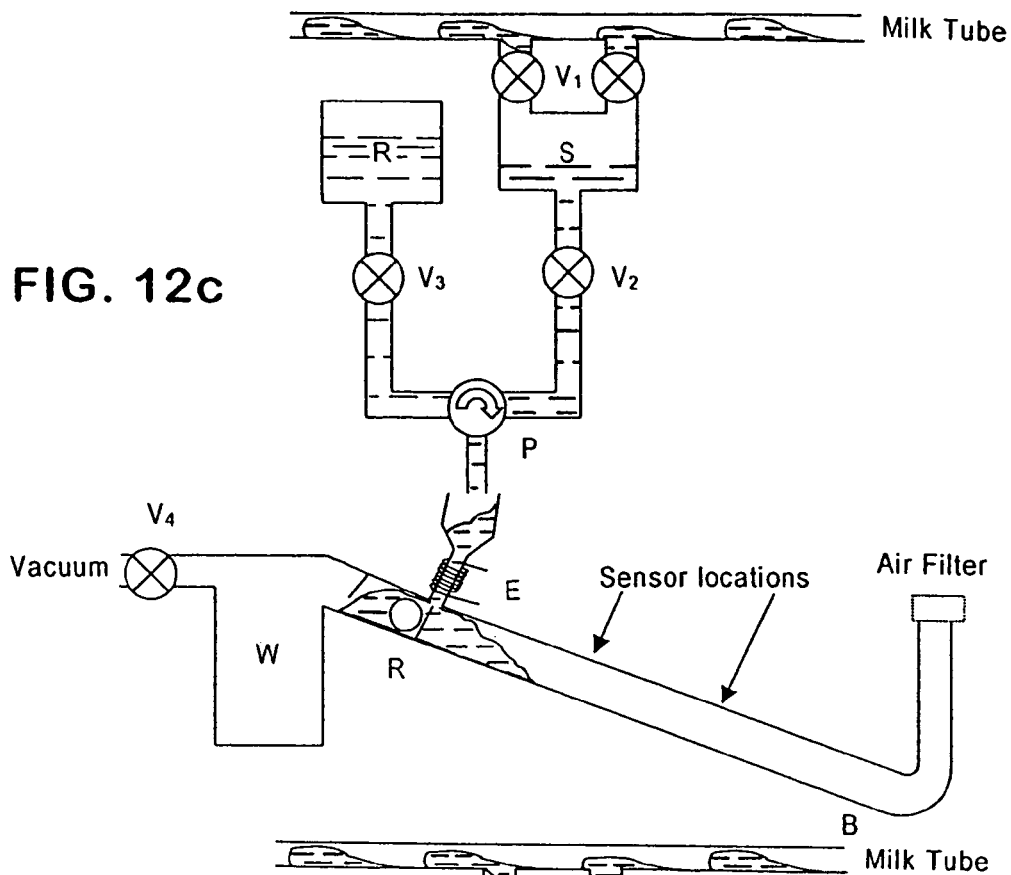
Figure 12D:
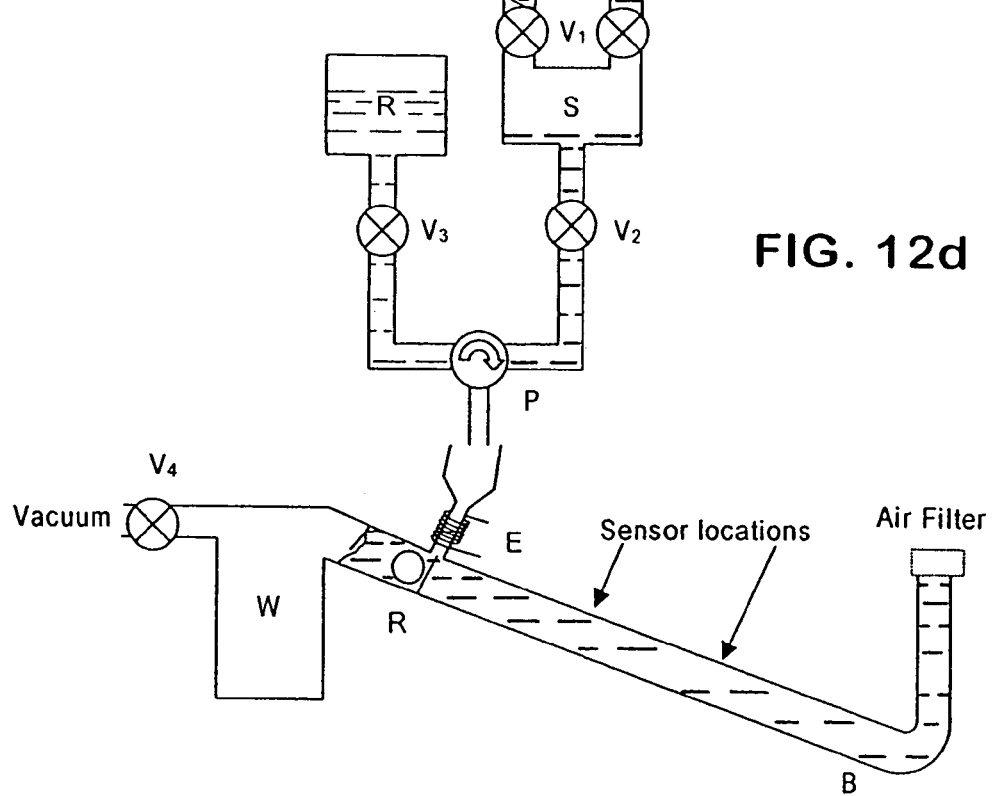
Figure 12E:
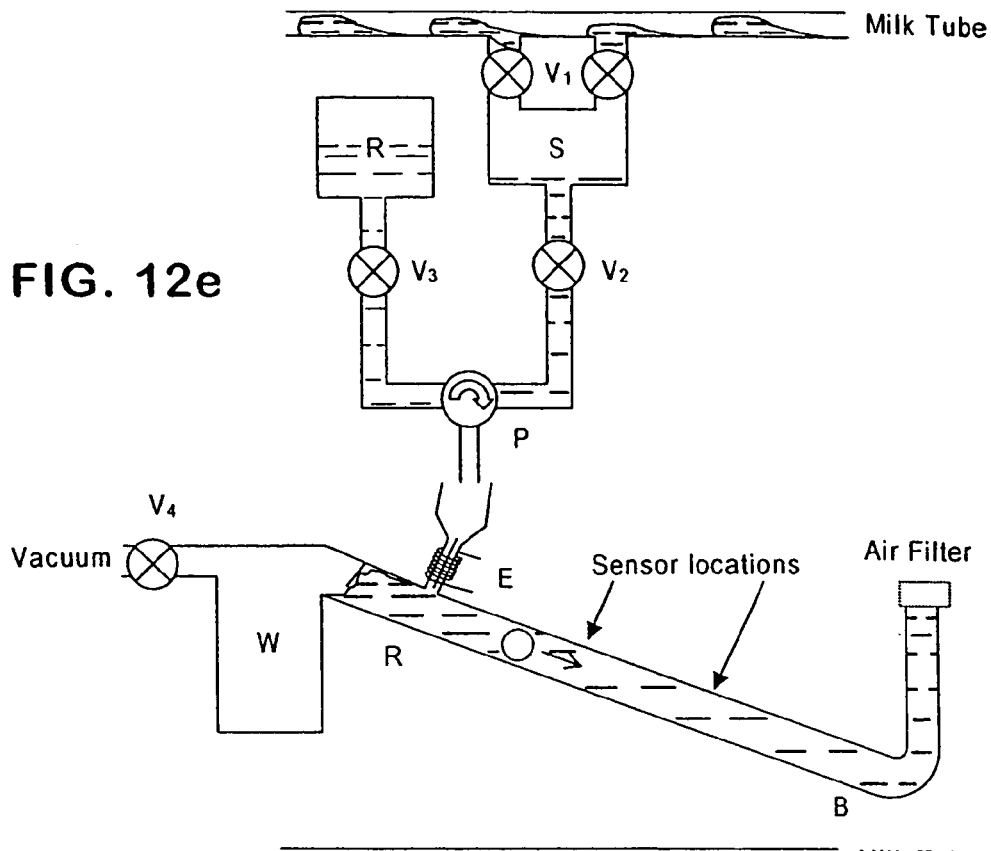
Figure 12F:
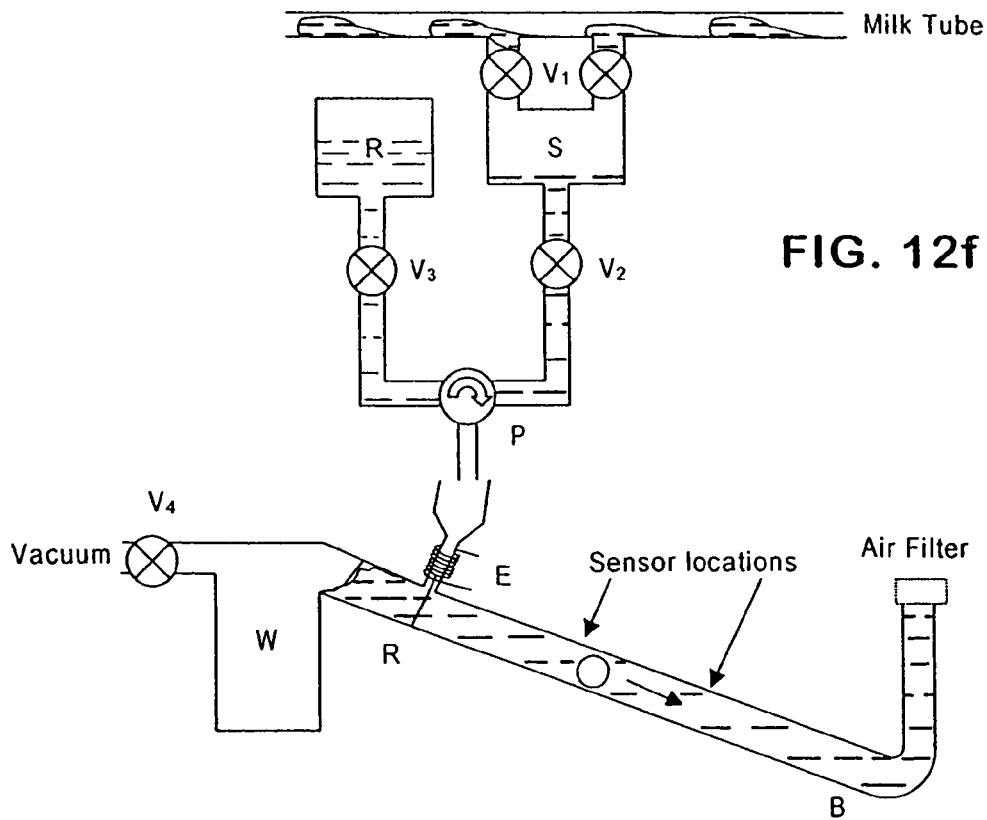
Figure 12G:
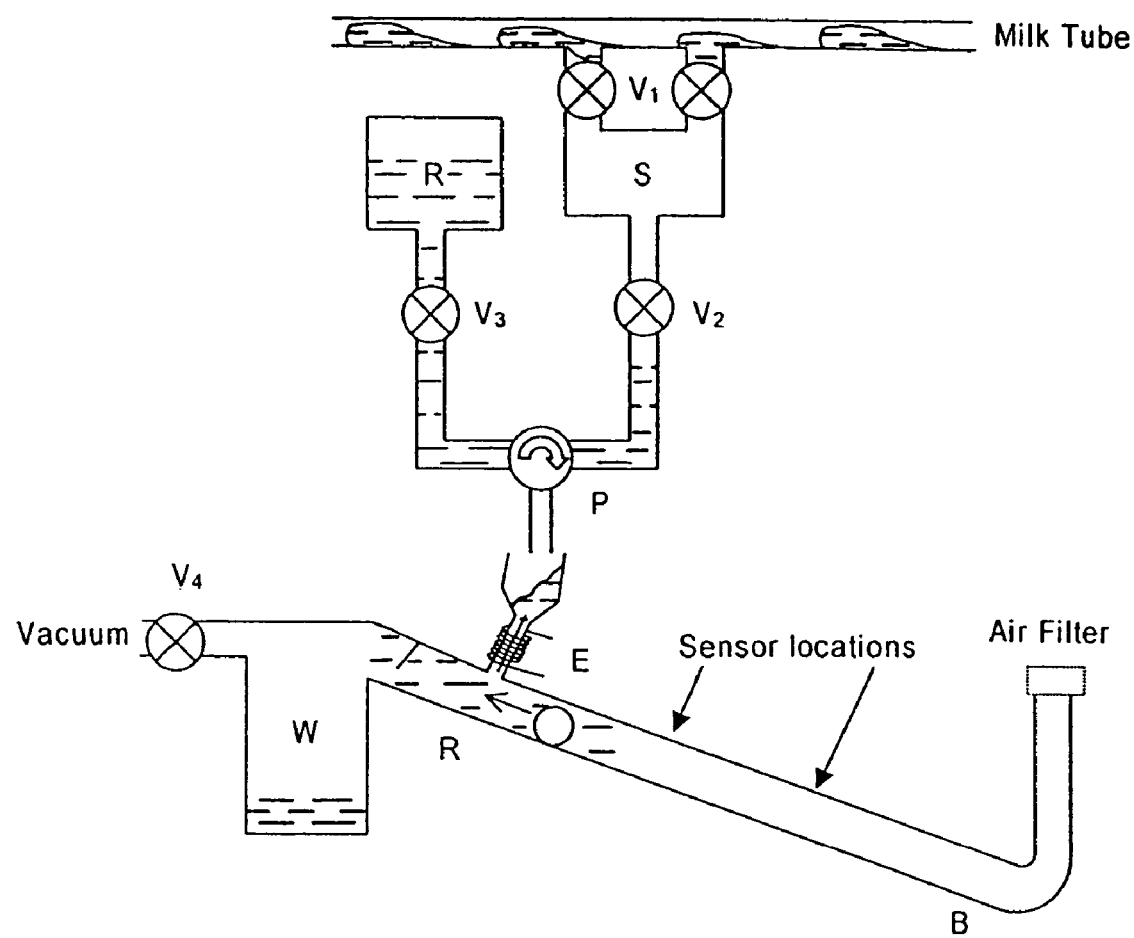
Figure 13:
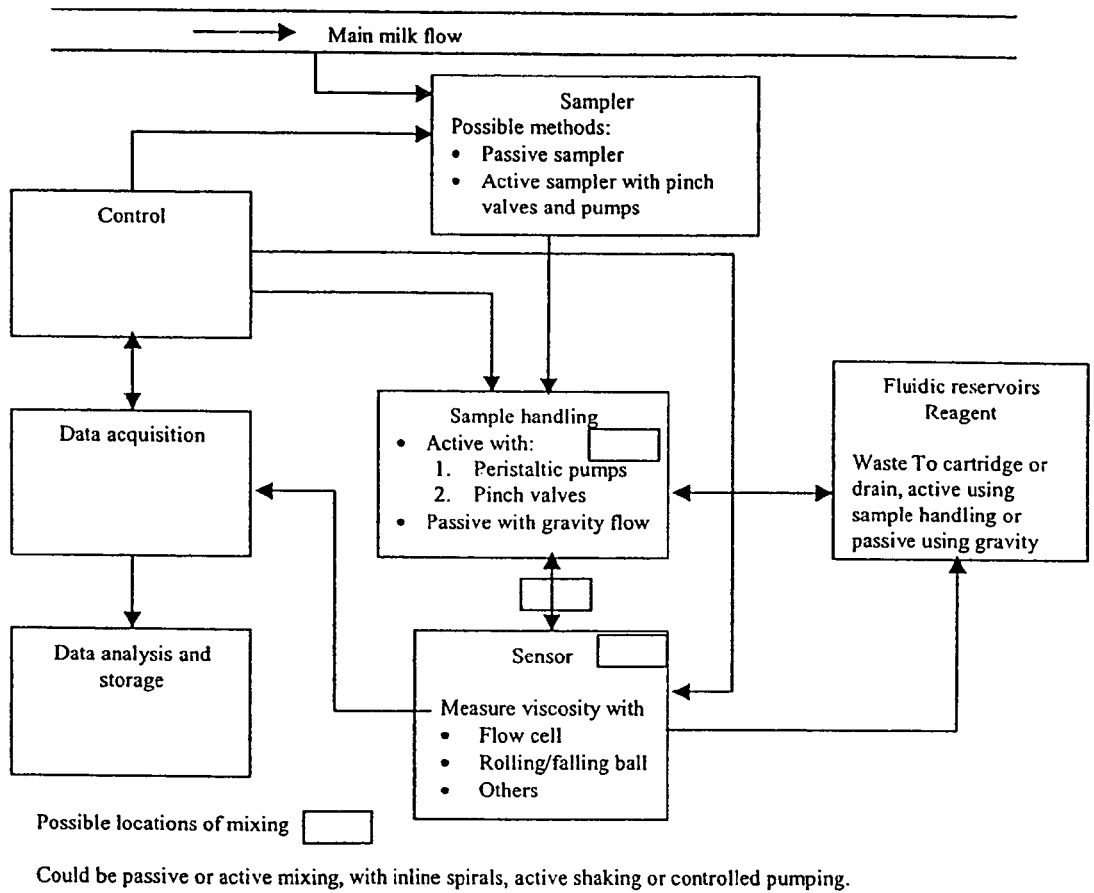
FIG. 13 is a block diagram showing preferred flow parameters and options.
Figure 14:
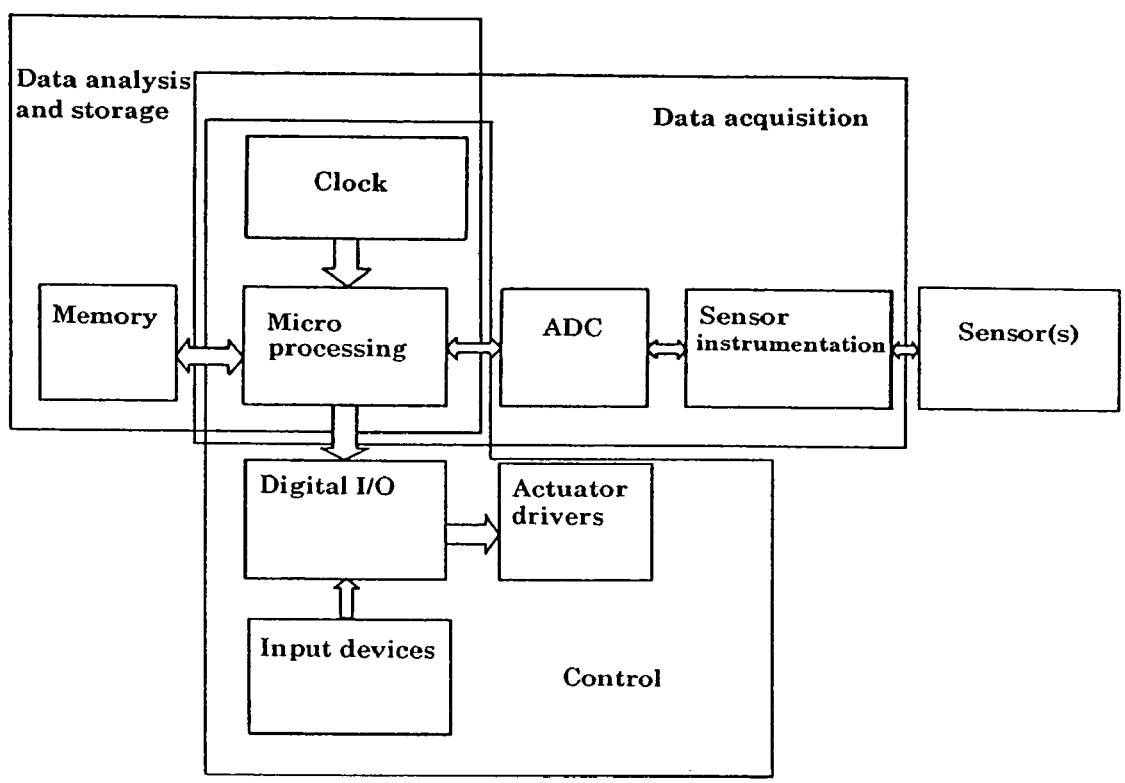
FIG. 14 is a block flow diagram of electronic systems useful in apparatus and methods of the present invention.

FIGS. 12A through 12G depict diagrammatically a preferred system in accordance with the present invention with the explanations as to the system modules and electronic systems being shown by way of flow diagrams FIGS. 13 and 14 respectively. In FIGS. 12A through 12G are shown the following:

milk tube or line 8 showing the pulsing movement of milk there along,
  a reagent reservoir "R",
  milk line flow diversion valves $V_1$,
  a sample reservoir "S",
  reagent valve $V_3$,
  milk sample flow control valve $V_2$,
  a flow control pump P,
  a dwell zone 9 with inflow greater than outflow,
  cell solenoid E to control a ball 10 retention pin to hold the ball until released in its upper cot condition as shown in FIG. 12B,
  sensor locations 11 and 12,
  an air filter 13,
  a vacuum valve $V_4$, and
  a waste reservoir W.

The operation of the apparatus can best be described by reference to the cycle description in Table 2.

TABLE 2

| | Description of Cycle | |
|---|---|---|
| Step in Cycle | Description | Components Used |
| FIG. 12A | Evacuation and reset | |
| a.1.1 | Turn on valve to evacuate the chamber and move ball up | $V_4$ On |
| a.1.2 | Move pin up to allow ball to pass | E (electro magnet) On |

TABLE 2-continued

Description of Cycle

| Step in Cycle | Description | Components Used |
|---|---|---|
| a.1.3 | Turn on valve and pump to remove any previous sample | $V_2$ and P On |
| a.2 | Time delay | |
| a.3.1 | Pin moved down | E Off |
| a.3.2 | Sample valve and pump stopped | $V_2$ and P Off |
| a.3.3 | Time delay | |
| a.3.4 | Vacuum switched off | $V_4$ Off |
| FIG. 12B | Sampling milk sample | |
| b.1 | Valve open | $V_1$ On |
| b.2 | Time delay | |
| b.3 | Valve closed | $V_1$ Off |
| FIG. 12C | Mixing and sample into tube | |
| c.1.1 | Sample valve open | $V_2$ On |
| c.1.2 | Reagent valve open | $V_3$ On (may alternate with $V_2$) |
| c.1.3 | Pump on | P On |
| c.1.4 | Time delay | |
| c.2.1 | Pump Off | P Off |
| c.2.2 | Sample valve closed | $V_2$ Off |
| c.2.3 | Reagent valve closed | $V_3$ Off |
| FIG. 12D | Settling time | |
| d.1 | Time for ball to pass sensors | |
| FIG. 12E | Ball release and measure | |
| e.1 | Pin moved up | E On |
| e.2 | Time ball to pass to predetermined places in measured | |
| FIG. 12F | Ball reaches bottom | |
| FIG. 12G | Reset and evacuation | |
| g.1.1 | Turn on valve to empty the chamber and move ball up | $V_4$ On |
| g.1.2 | Move pin up to allow ball to pass | E (electro magnet) On |
| g.1.3 | Turn on valve and pump to remove any previous sample | V2 and P On |
| g.2 | Time delay | |
| g.3.1 | Pin moved down | E Off |
| g.3.2 | Sample valve and pump stopped | $V_2$ and P Off |
| g.3.3 | Time delay | |
| g.3.4 | Vacuum switched off | $V_4$ Off |

The aforementioned cycle in respect of FIGS. 12A through 12G shows one method whereby apparatus could be worked. Another arrangement could be typified by the following tabulated procedure in Table 3.

TABLE 3

| | Block Diagram of Rolling Ball Sensor | |
|---|---|---|
| | Method of getting sample into tube. This could include pumps, gravity Tube with ball in it. Tube diameter could be variable, and ball diameter viable. | |
| Way to hold ball at top system. Include Pin actuated by electromagnet or electromagnet holding ball directly | Method to get ball up, this could include air flow/vacuum evacuation, gravity or electric field. | System for measuring ball, this could include light beam(s) being blocked, electromagnetic detection. |
| | Method to evacuate the tube, this could include gravity, pumping or vacuum. | |

Still a further arrangement could be that depicted by Table 4.

TABLE 4

Method of getting sample into measurement system, this could include pumps, gravity
Measurement system.
Method to evaluate and clean measurement system.
Could include gravity, pumping or vacuum.

The apparatus is preferably automated online but can be, if desired, provided with a command feature whereby a farmer can run the testing regime for a particular cow or stall or during particular milkings.

Placement in Herringbone, Rotary and Robot

In an herringbone milking system the SCC measuring device preferably will be placed such that it will analyse milk flowing between the claw and the milk line. It will be attached to the milk line and have the milk from the dropper tubes flow through it.

In a rotary it preferably will be again placed such that it will analyse milk flowing between the claw and the milk line. It will be attached to the rotary platform or milk line.

In a robotic milker preferably there will be one device per quarter or one device for the composite milk. It will be placed between the cups and milk collection vessel. Or after the collection vessel to test the composite milk.

Calibration Equations

Figure 9:
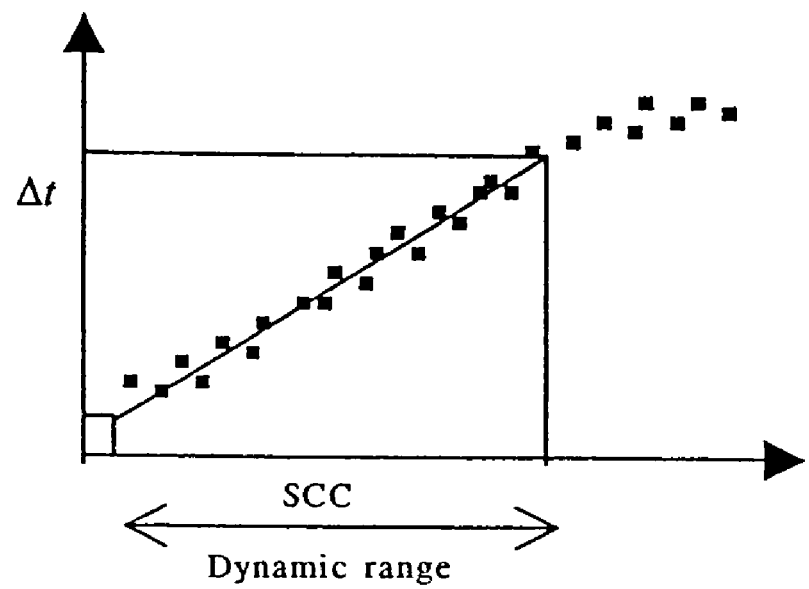
FIG. 9 shows a simplified plot of time for a rolling ball fall against SCC thereby showing a dynamic range of preference within which any testing regime should preferably operate, such dynamic range being described hereafter.

FIG. 9 shows an example of a calibration curve; this is obtained by measuring a sample with a known amount of SCC and recording the change in time ($\Delta t$). These results are then transformed using some linear transformation technique. The results are then plotted with $\Delta t$ versus SCC.

Over the dynamic range the $\Delta t$ is related to the SCC by the following equation where $b_0$ and $b_1$ are the coefficients of linear regression. These are calculated from least squares analysis of the data.

$$\Delta t = b_0 + b_1 SCC$$

The SCC can then be determined by solving for SCC, which yields the following equation. Therefore by measuring the $\Delta t$, it is possible to determine the SCC.

$$SCC = \frac{\Delta t - b_0}{b_1}$$

From the foregoing therefore it is believed that standard surfactant amounts coupled with standard milk sample amounts in substantially similar ambient conditions will provide sufficient consistency to allow worthwhile data to be generated from the detectors and to be processed to provide effective information to a dairy farmer.

Changes Over Milking, and Over Day to Day

Woolford et al 1998 shows that SCC can be used to determine mastitis. If a threshold of 500000 cells/ml (see Table 1) is used the disease status can be determined. If the first milk is used (fore milk) the SCC only gives 5% false positives. If main milk is used then less false positives are obtained but more infections are missed. If the last milk (strippings) are used 9% of cows are false positives but more are detected (see tables 4 & 5 in Woolford et al).

Figure 11:
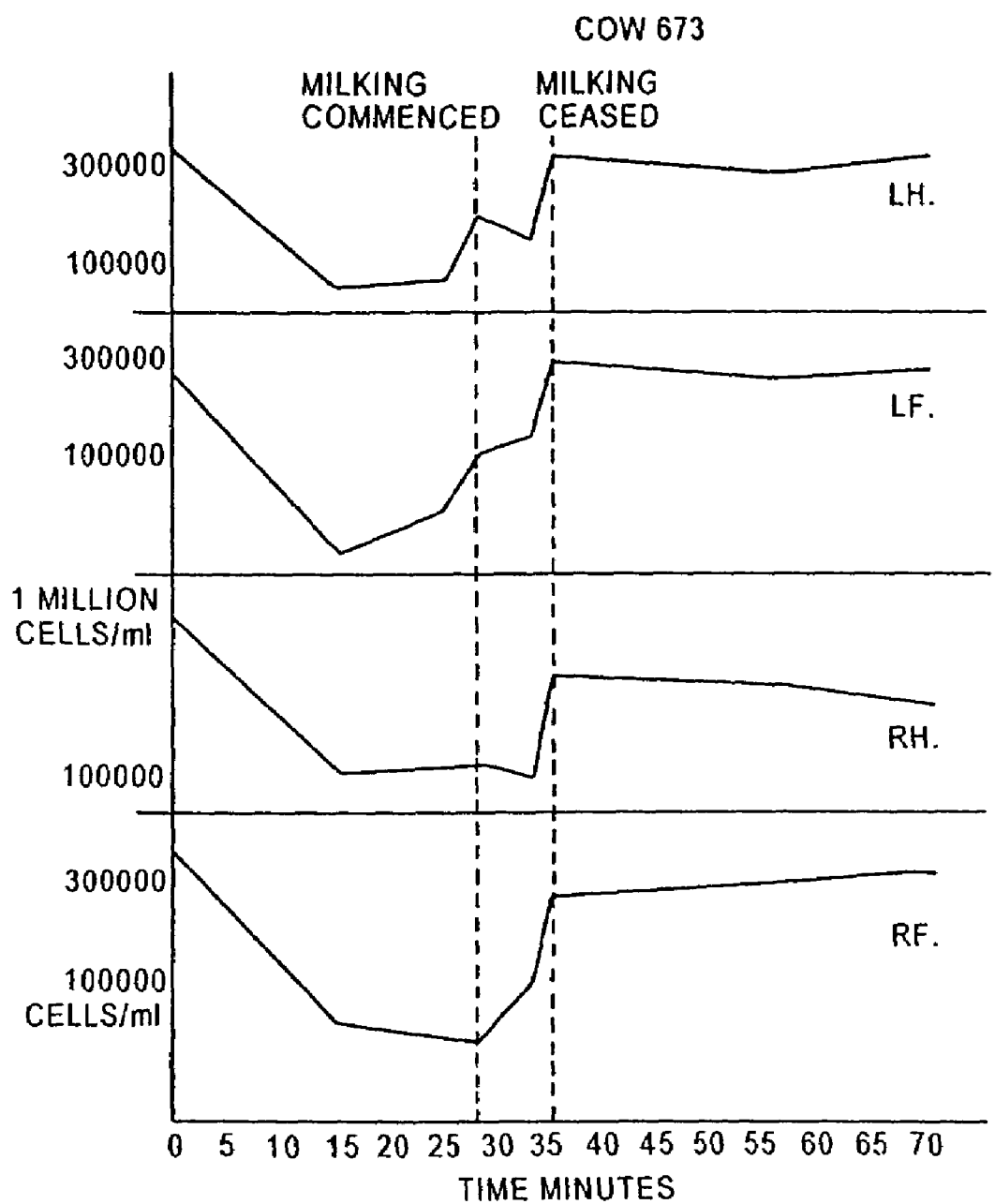
FIG. 11 is a plot (White and Rattray, 1965) showing for a particular cow and its four teats the changes in SCC during an after milking, the rise in cell count during milking as they have indicated often being a factor or 10 or more and with any decline in cell count between milkings arising from dilution effects in the lower cisternal region of the animal and which decline may be subject to daily fluctuations in yield.

As shown in attached FIG. 11 the SCC changes over a milking. White and Rattray (1965) reported changes in cell count levels during and after milking, the rise in cell count during milking often being by a factor of ten or more.

FIG. 11 shows individual quarter variations in cell count over a 70 minute period prior to, during, and after milking.

Therefore it is important to analyse the milk at a predetermined time after the start of milking every day. Schalm et al 1957 also stated that the SCC rose between the start of milking (foremilk) and the end (strippings).

Figure 1A:
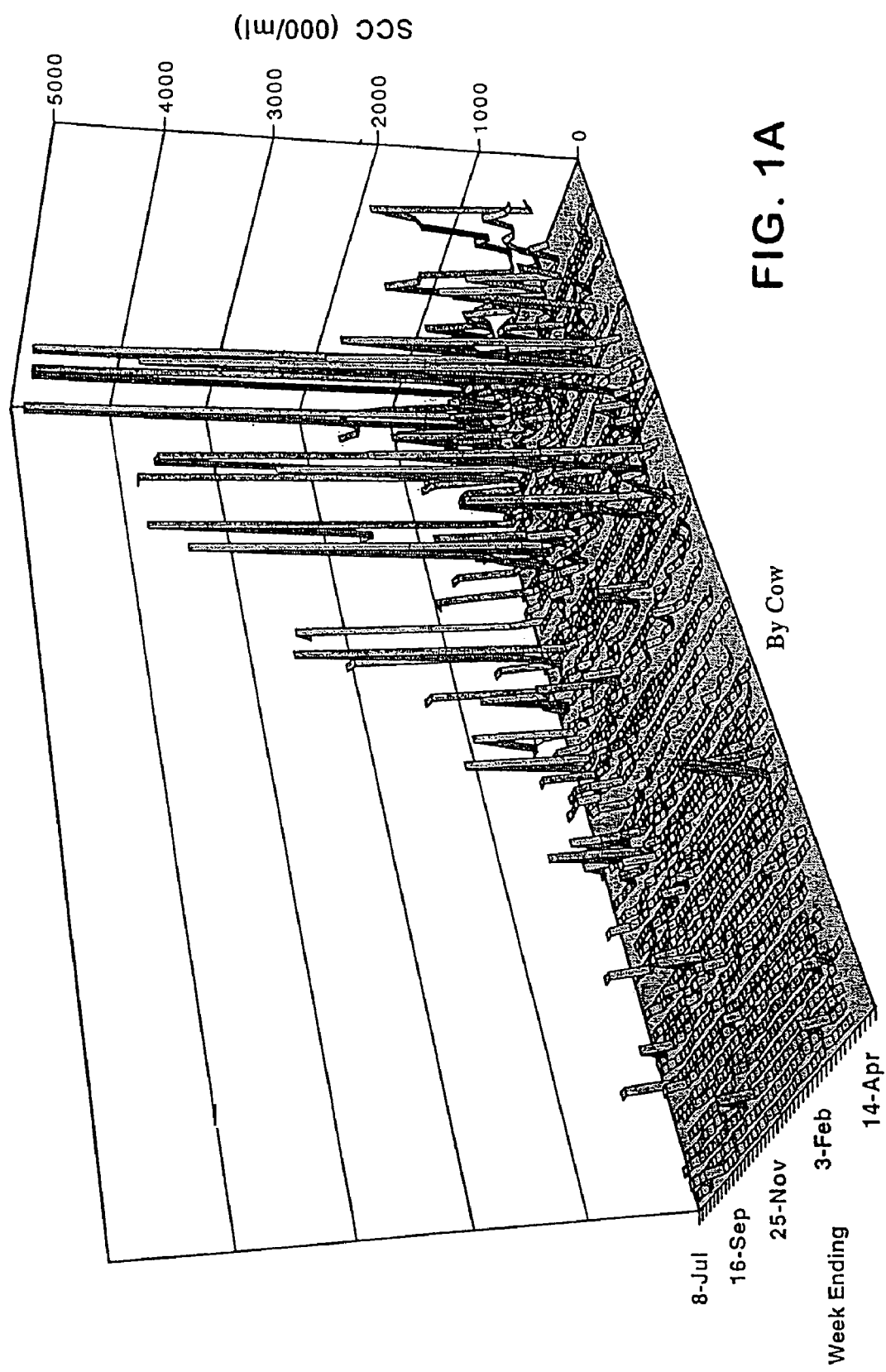
FIG. 1A shows for a July through April period the upper 50% of the DRC herd ranked in order of average SCC, the peaks being against a scale ranging from 0 to 5 million cells/mL, whilst correspondingly
Figure 1B:
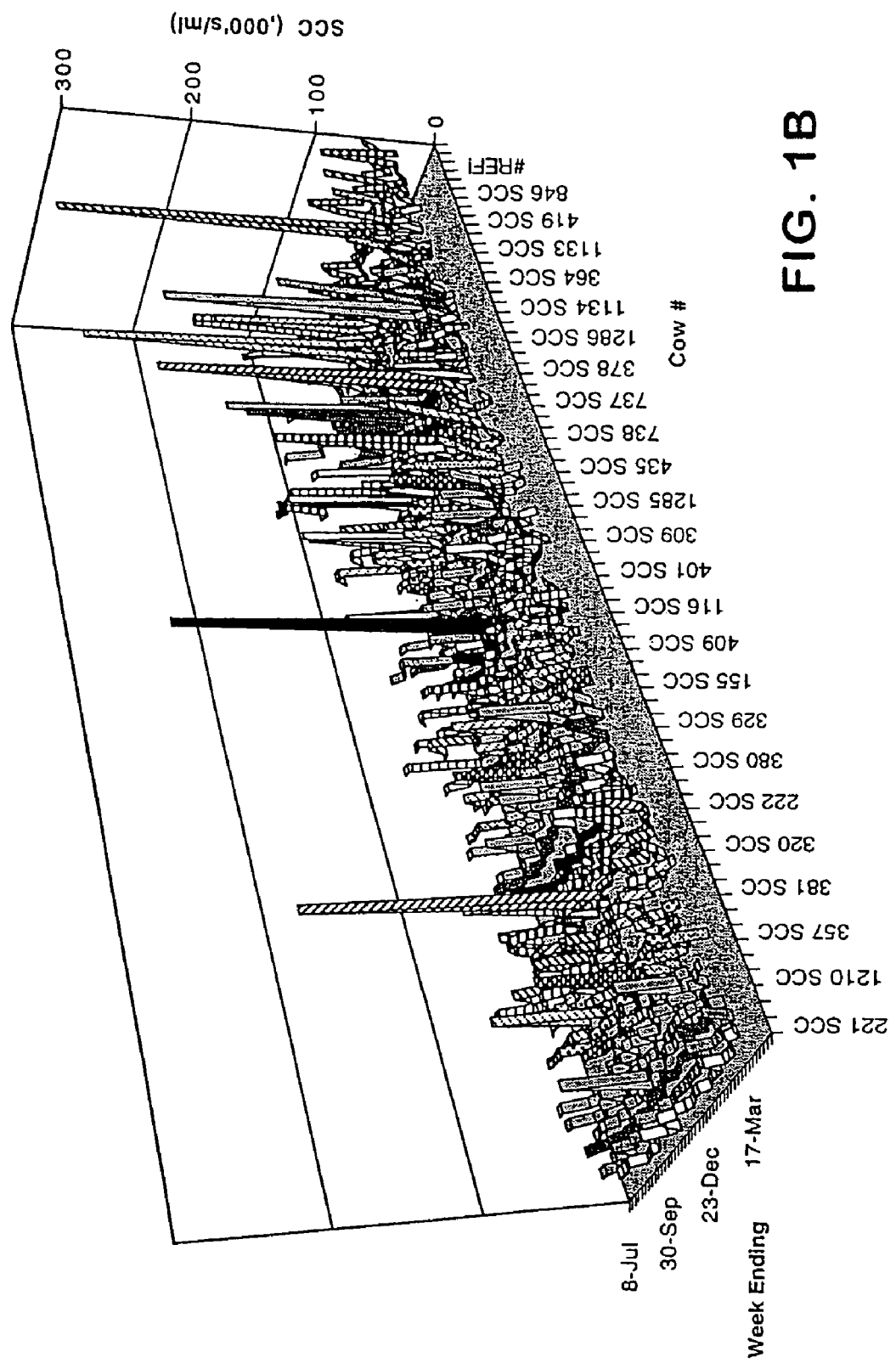
FIG. 1B shows the remainder of the herd likewise ranked for the same period but over a range of somatic cell count depicted on an axis running to 300,000 cells/mL only, the diagram thus showing the significant variation per animal over the period and the extent and localised nature of infection in a herd.

Woolford et al (1998) also showed the measurement of milk every day is important to determine the health of the cow due to high day-to-day variation. In this respect see FIGS. 1A and 1B which are FIGS. 2 & 3 from Woolford et al.

The present invention envisages preferably any desired same time consistency during milking eg; tied to one or more of
(i) commencement of milking generated milk flow,
(ii) duration or volume of draw off, and/or
(iii) elapsed milk flow.

The applicants have further investigated the mechanisms behind the theory of the gel formed as a result of the mixing of a milk sample and an anionic detergent (surfactant), and accordingly discuss the theory of gel formation of the admixture.

In addition, it is acknowledge that the dwell zone or second mixing stage of the method as herein described is particularly useful in achieving an admixture of milk sample and anionic detergent with a viscosity which is indicative of the number of somatic cells present in the milk sample.

FIG. 35 illustrates an embodiment of the present invention, and table 7 outlines the general apparatus configuration. In particular, this embodiment comprises a system which, after obtaining a milk sample, diverted from a milk flow (for example from a line 25 extending from a milking claw); has a first mixing chamber, optionally having a conductivity probe or probes 12, 13, 14 attached for level detection to thereby provide feedback to a controller such as an electronic controller operating a pump 1 which supplies the milk sample to the mixing chamber. One conductivity probe (such as probe 14) may be used in conjunction with pump 1 to pre-flush the sample tube, mixing chamber and other components prior to testing a sample and a short reagent flush may also take place in order to minimise the effects of carry-over from a previous sample. Both pre-flush sample and reagent are discarded to waste.

With pinch valve 5 now closed, pump 1 is operated to introduce the milk sample into the mixing chamber. Pump 1 is operated until a predetermined volume of milk sample is fed into the mixing chamber such as detected by conductivity probe 13. Pump 1 is then turned off and an anionic detergent is supplied to the mixing chamber via pump 6. The volume of detergent added to the mixing chamber may be controlled with input from conductivity probe 14. The milk sample and anionic detergent are combined and mixed to form an admixture. This admixture preferably has a viscosity which is an indicator of SCC, and therefore mastitis.

In the mixing chamber the milk and detergent may be combined by adding these components to the chamber at a tangent to a substantially vertical wall of the chamber to induce a swirling mixing motion and allow a fluid shearing motion of the components. This mixing ideally allows the detergent to contact the somatic cells in the milk sample, lyse the cell walls, and then react with the DNA inside the cell.

The first mixing step increases the viscosity of the sample but not to a level where quantitative calibration against somatic cell count can be determined. Therefore, the applicants also use a second treatment step to further increase the viscosity of the admixed sample and to ensure that the milk sample and detergent are fully mixed. It is this second treatment stage that may allow the admixture within the apparatus of the present invention to fully reach its most viscous point/level. By achieving an admixture at its most viscous point, and then measuring this viscosity, this in turn is a more accurate level of SCC in the milk sample.

Preferably the second treatment step is a second mixing step. The second mixing step may simply comprise allowing the initially admixed sample to flow from the mixing chamber, by opening pinch valve 5 after a predetermined period of time, into a subsequent chamber or dwell zone (labelled "flow cell" in FIG. 35). That is, the action of (and turbulence induced by) simply flowing the admixture from the mixing chamber may in itself impart sufficient mixing to raise the viscosity of the admixed sample to a point whereby more accurate SCC level testing may be carried out.

Alternatively, the further treatment may comprise heating the admixture, vibrating the admixture (such as by subjecting the admixture to ultrasonic vibration), subjecting the admixture to a static or time varying electric field or adding a reagent to the admixture (for example, blowing air into the admixture or drawing air through the admixture). This further treatment could occur in the mixing chamber, or in the flow cell or even as the gel passes from the mixing chamber to the flow cell.

As mentioned above, the further treatment or second mixing step may occur in (or whilst flowing to) a chamber or dwell zone thereby allowing a further mixing of the detergent and the DNA which spills from the somatic cells when the cell walls are broken or lysed. It is the reaction of the somatic cell DNA or attribute of the somatic cell DNA and detergent that forms a gel or viscous admixture. The applicants hypothesise that by providing a further viscosity increasing treatment or mixing step, the lysed cell DNA/detergent complex can further form. That is, in a first mixing step, the cells are lysed, and some DNA/detergent reaction occurs. However, in the further treatment or second mixing step, the likelihood of detergent reaction with the cell DNA is further enhanced/enabled.

After this step, the viscosity of the admixture/gel is measured, either in the dwell zone (or flow cell) or in a testing chamber/zone. The testing zone may include the flow cell itself. Preferably the dwell zone or flow cell has a reduced diameter exit hole which allows the gel to pass freely into the waste chamber. The reduced diameter exit hole allows the gel to drain from the flow cell under gravity at a rate slower than the gel enters the flow cell and dependent upon the gel's viscosity. Conductivity probes 15, 16 are provided in the flow cell and the time for the level of gel in the flow cell to drop from the higher conductivity probe 16 to the lower conductivity probe 15 is measured (or in other words, the time taken for a known volume of gel to pass through a flow restricting means) and recorded and is directly related to the SCC of the admixed sample.

The following table provides example results based upon the determined gel descent time between the two conductivity sensors.

| Time to descend (seconds) | SCC Band (kcells/mL) |
|---|---|
| t < 0.380 | (Invalid result - error) |
| 0.380 < t ≤ 1.800 | 0 ≤ SCC ≤ 200 |
| 1.800 < t ≤ 2.500 | 200 < SCC ≤ 500 |

-continued

| Time to descend (seconds) | SCC Band (kcells/mL) |
|---|---|
| 2.500 < t ≦ 6.300 | 500 < SCC ≦ 1500 |
| 6.300 < t ≦ 59.000 | 1500 < SCC ≦ 5000 |
| t > 59.000 | SCC > 5000 |

After a predetermined period of time, a vent valve 8 is closed thereby closing off an atmospheric bleed passage from the waste chamber. A waste pump 7 is then operated to pump the gel to waste. This eliminates any blockage inside the flow cell and its exit tube as the waste pump is capable of creating a negative pressure differential inside the waste chamber.

As described in the further description below, the applicants believe that an understanding of the formation of a viscous admixture (or gel) is essential in understanding why a further treatment or second mixing stage/step/chamber is necessary—and how it impacts on more accurately measuring the SCC in a milk sample being tested. The present invention may also be used in conjunction with multiple milk sample measurements from an individual (or a number of identified/tracked animals, e.g. a herd), to compare viscosity measurements and therefore track the SCC of milk from that animal or animals, and therefore the likelihood of whether an animal may have mastitis, and as an indicator of the health of that animal or a herd of animals.

The present invention is ideally a fully automated system and alleviates the need for manual or laboratory testing procedures.

Theory of Operation

Introduction

The applicants have created an on-line sensor technology platform that is capable of giving a real-time somatic cell count (SCC) for an individual milk sample taken whilst a cow is being milked. It determines the number of somatic cells by measuring the viscosity of the milk after it has reacted with an anionic detergent. To gain an understanding of how this sensor technology works the following section includes information on the theories of gel formation and fluid mechanics. It also includes some review of the history of previous attempts by other parties to automate this process. Finally it describes the theory of operation of the applicant's testing technology platform.

Theory of Gel Formation

This technology is based upon the phenomenon of an increase in viscosity that arises when an anionic reagent is added to DNA-containing cells. An anion is a negatively charged ion, that is, a molecule or atom that has a negative charge. An anionic reagent is a reagent that has this negatively charged group. Schematically an anionic reagent is shown as a rod with a spherical head. The head is the negatively charged area and the tail is made up of a hydrophobic (water hating) hydrocarbon chain. In aqueous (water based) solutions, like milk, the anionic reagents form micelles whereby the hydrophobic tails group together to avoid the water as much as possible, thus exposing the hydrophilic (water loving) heads. Molecules that do this are commonly known as detergents. See FIG. 15 for a pictorial illustration.

Detergents are used not only in cleaning products but also in a large number of chemistry applications. For example, detergents are used to lyse (i.e. destroy or break up) cells, extract DNA or help measure the size and charge of proteins.

In a common DNA isolation procedure a detergent is added to lyse the cell so that it forms a gel. This gel is then processed to remove the DNA. This effect was noticed in milk by Schalm and Noorlander,[1] in 1957, by modifying the Whiteside test[2]. The Whiteside tested added a very strong alkaline solution, concentrated sodium hydroxide, to milk. If the milk was abnormal it formed a thick viscous mass. Schalm and Noorlander modified it by changing the reagent to anionic detergents. This test became a common cow side mastitis test called the California Mastitis Test or Schalm Test[3] or Mastitis NK Test[4].

[1] Schalm and Noorlander Journal of the American Veterinary Medical Association Vol 130 No 5 Mar. 1957 pg 199–204
[2] Whiteside, W. H. Observation on a new test for the presence of mastitis in milk Canadian Public Health Journal Vol 30 1939 pg 44
[3] Berchtold M, Ammann H, Hanselmann R. [Significance of the Schalm-test for cattle guarantee] Schweiz Arch Tierheilkd. 1973 January; 115(1):16–20.
[4] Skardova O, Sedinova V, Skarda J, Urbanova E, Bilek J. Methods of diagnosing subclinical mastitis in dairy cow mastitis control programs] Vet Med (Praha). 1984 February; 29(2):65–77.

Although the theoretical background behind this test was investigated in the 1960's, significant progress has been made in biochemistry since this time. Applying both the historical knowledge of this test and the knowledge from new developments in biochemistry the applicant has developed the following theory to explain how the DNA gel forms:

The somatic cells are lysed by the reagent, releasing the DNA. However, bacteria have a more robust cell wall, not just a bilipid membrane like somatic cells. Therefore they are not lysed by the reagent. Hence bacteria do not affect this test. The DNA released from the lysed somatic cells binds with the anionic reagent to form a gel. This process is explained in more detail below.

Cell walls are made up of two lines of phospholipids that form a lipid bilayer. Phospholipids are like anionic detergents in that they have a charged 'water loving' end and tails made up from hydrocarbon chains. However the tails have two hydrocarbon chains. This means that they form sheets instead of micelles (see FIG. 16). A lipid bilayer is formed when two of the hydrocarbon chains face each other so that the water loving parts of the phospholipid face the aqueous solution on both sides of the bilayer. A lipid bilayer forms around the cell to make up the cell membrane.

It is clear from FIG. 16 that detergent molecules are very similar to phospholipids. It is because they are similar, but different, that they can lyse the cell wall. It is hypothesized that the reagent breaks down this cell wall by the following process[5]:

1. Individual reagent molecules are absorbed into the lipid bilayer around the cell.

[5] Helenius and Simons Solubilization of membranes by detergents Biochemical et Biophysical Act Vol 415 1975

2. These absorbed reagent molecules change the molecular organization of the cell wall. This alters the cell's permeability.
3. The change in cell permeability changes the cell's osmotic equilibrium. Therefore the cell absorbs water and bursts.
4. This leads to leakage of cell contents.

FIG. 17 shows a lysed bacterial cell, releasing its DNA. It is clear from this picture that a single cell contains a lot of DNA. It is estimated[6] that a human cell has between 2–3 meters of DNA. A bovine cell is likely to contain a similar length of DNA.

[6] http://hypertextbook.com/facts/1998/StevenChen.shtml

It is clearly no simple task to pack meters of DNA into a cell that is no bigger than 5 μm in diameter. This incredible task is performed by the DNA first winding around proteins called histones (see FIG. 18). The histone/DNA complex is then rolled up in loops, rosettes, coils, and finally a chromosome (see FIG. 19), with 30 of these chromosomes in each somatic cell. This clever packing allows such a large length of DNA to be packed into a cell.

The applicant has developed a unique theory of DNA/detergent gel formation. It is based upon the properties of detergents discussed above and the following facts:

It has been known for some time that DNase, an enzyme that breaks up DNA causes a reduction in gel formed by DNA and detergent[7]. It has also been shown that DNase will inhibit bovine somatic cells from forming a gel[8].

[7] Dounce, A., O'Connell, P., and Monty, K., Action of Mitochondria DNAase I in destroying the capacity of isolated cell nuclei to form gels. Biophys and Biochem Cytol 1:155 1955
[8] Nageswararao and Derbyshire Studies on the mechanism of gel formation in the CMT J Dairy Res Vol 36 1969

It is common knowledge that detergents also interact with proteins. Proteins are made up of approximately 20 building blocks. These building blocks are called amino acids. Each amino acid has special properties. Some of them have a positive net charge. Therefore one of the ways in which proteins and detergents interact is through their charge: the negative charge of the detergent is attracted to the positive charge of the protein amino acids.

The applicant has shown that as pH increases the viscosity of gel formed increases. An increase in pH makes the proteins more positively charged.

Proteases, enzymes that break up proteins, decrease or eliminate the formation of a gel[9].

[9] Nageswararao and Derbyshire Studies on the mechanism of gel formation in the CMT J Dairy Res Vol 36 1969

Christ[10] proposed the following theory of gel formation. Negatively charged detergent heads bind to positively charged proteins surrounding the DNA. The reagent's hydrocarbon tail is then exposed in water. Since this hydrocarbon tail is strongly hydrophobic, it is attracted to the tails of secondary reagent molecules. These detergent molecules' charged heads are repelled by the charged heads of other detergent molecules bound to other histones. The result is effectively a long worm-like micelle with the DNA in its centre. When many long wormlike micelles form, the gel builds up. However this cannot explain the rigidity observed in the fluid mechanics section.

[10] Von W. Christ—Mit 3 Abbildungen Uber das Reaktionsvermogen von proteinen mit synthetischen netzmitteln als grundlage zum verstandnis des California mastitis testes. Deutsche tierarztliche woshenschrift. No 4 pg 108–110.

Based on this theory, we propose that the reagent's negatively charged end forms an ionic bond with the positively charged histones. The reagent's hydrophobic hydrocarbon tail is then exposed in water and binds to the tail of a second reagent molecule by Van der Waal's forces. The charged head of the second reagent molecule then binds to another histone molecule, thus binding one DNA strand to another. The DNA holds the histones together so that the gel can build up; see FIG. 20 for schematic diagram.

Nearly all viscosity measurement systems are designed for these Newtonian fluids. However there are a group of fluids that are non-Newtonian. Therefore they do not have a linear relationship between shear stress and shear rate. The gel formed by the addition of detergents to cellular solutions is non-Newtonian. Fluids that change depending on what has happened to them in the past are called time dependant fluids. The gel exhibits this time dependant property. The gel also exhibits properties that belong to solids, so it is also a visco-elastic fluid.

Time Dependant Fluids

Time dependant fluids change their behaviour depending on what has occurred to them in the past. They may increase their viscosity, thus being rheopectic or decrease their viscosity, being thixotropic. If this decrease in viscosity is permanent it is called rheodestructive.

Rheopectic fluids are rarely found. However the gel clearly demonstrates rheopectic behaviour as it forms. It has been stated in literature that DNA gels break down when only small shear stress is applied[11]. It has also been observed that the DNA gel formed by SCC in milk is easily broken[12]. The applicant has scientifically demonstrated, for the first time, the rheopectic and rheodestructive nature of the DNA gel, see FIG. 21.

[11] Robins, A., Non-Newtonian Behavior of Dilute DNA Solutions, Transactions of the Faraday Society Vol 60 pg 1344 1964.
[12] Milne, J. R. Observations of the Californian Mastitis Test (CMT) reaction. II. Photomicrographic studies of somatic cells and their reaction with surface active agents. New Zealand Journal Dairy Science. Technology. 12:48–50, 1977.

In an experiment, milk and reagent were placed together in a beaker. A rotational viscometer was used to continually measure the gel's viscosity. At the start of the reaction the gel is forming so the viscosity increases. The gel is then formed and is stable for a period of time. Then the gel then breaks up under the applied force, thus showing that the gel is rheopectic and rheodestructive.

Visco-Elastic

Visco-elastic fluids, unlike Newtonian fluids can transmit shear stresses. This means that they behave like a solid and a liquid. A test to determine if a fluid is visco-elastic is to rotate a spindle in the fluid. If the fluid is visco-elastic it will climb the spindle, if it curves up the outside of the container it is not visco-elastic. This is illustrated in FIG. 22.

Applying this test to the DNA gel, it rises up the spindle as depicted in FIG. 22, thus demonstrating visco-elasticity.

1.1 Variation of Measured SCC Due to Effects of Other Components

Milk components not directly related to the component of interest can affect the measurement system, no matter what underlying method is used. For example, it is expected when attempting to spectroscopically measure fat, that the readings are affected by protein levels.

Combined samples, such as those from bulk tanks are an average of many cows, so the effect of milk components is somewhat averaged out. Composite cow samples give more accurate results than composite quarter samples. Worst of all are spot quarter-milk samples. These effects become very important when you try to compare samples taken a few months apart with the same calibration. Lab-based spectrometer machines mitigate these effects by employing different calibrations depending on whether individual cow samples or bulk tank samples have been taken. As the season progresses, so does the calibration. There are also different calibrations for different breeds of cow. These effects are expected to be smaller for herds consisting of cows of similar genetics and eating the same type of feed.

The effect of these subcomponents are one source of error for a viscosity-based SCC measurement technique.

Milne and De Langen (1977) showed that a combination of minor milk proteins can cause variability in the gel formation[13]. Work by the applicant has also indicated that changes in parts of the protein content could cause some variability in the gel formation. These effects are relatively minor, except when significant break down in the blood/milk barrier has occurred. When this happens, the SCC levels are generally extremely high, so the errors in the gel formation are inconsequential compared to the amount of gel formed.

[13] Milne, J., and De Langen, H., Observations of the California Mastitis Test (CMT) Reaction. I. The roles of deoxyribonucleic Acid (DNA) and milk proteins in the reaction, 1997.

1.2 History of Automatically Measuring Somatic Cell Gel Viscosity

In the past laboratory instruments have been developed to give an accurate SCC based upon gel formation. These are discussed below.

Rotary Viscometer Method

The Rotary Viscometer was used by a number of people to determine the viscosity of the gel. The inherit difficulties of determining when to take the measurement as the viscosity changes with time, as illustrated in FIG. 21, was overcome[14] by either taking the reading 2 minutes into the process or by measuring the maximum viscosity[15]. This yielded acceptable results for high somatic cell counts (see FIG. 23). Clearly an automated on-line version of this system would be complex, involving a number of moving parts. However, a rotary viscometer was used to gain a theoretical understanding of the gel, its formation and characteristics. It not only showed for the first time, as discussed above, some of the gel properties but also showed that even at a cell count level of 38 000 cells/mL a gel was forming. This is an extremely low level of somatic cells and demonstrates that using the right equipment it can be a very sensitive test.

[14] Nageswararao and Calbert A comparison of screening test to detect abnormal milk Journal of milk food technology Vol 32 pg 365–368 1969.
[15] Nichols G. and Phillips D. A rotary viscometer for leukocyte count determinations in milk. The Australian Journal of Dairy Technology, Vol 27 No 4 pg 134–136 1972

Falling Ball Method

Falling ball viscometers are known to be a good method of measuring time dependant non-Newtonian fluids. This is because if the correct density of ball is chosen the force on the fluid is at a very low shear rate. Therefore the fluid does not break up. Two parties investigated using a falling ball to measure gel. The first[16] did not succeed; this was probably due to inconsistent mixing. The second gave very good results that are shown in FIG. 24. The y-axis is kcells/mL (1000 Zeillen/mL) and the x-axis is fall time (Fallzeit). This shows a clear relationship between SCC and fall time. However the fall time is in 100's of seconds. This would make it impossible to achieve a quick enough turn around time for an individual cow sensor.

[16] Carre, X Effect of leucocytes on the viscosity of milk in the sodium lauryl sulphate test for mastitis Ec, Nationale Vet, Lyn: These 22 1970.

The applicant has duplicated these results. An example of this is shown in FIG. 25. This was an average of two data points for each milk sample. It shows that the formation of the gel is still causing a response at 50 000 cells per milk. Clearly in a sensor situation, where the signal must be discernable from the noise, the lower limit of detection would be about 150 000 cells/ml. This work was continued by the applicant to explore the ability to automate the falling ball method. However it was quickly determined that the required tolerance between the ball and the tube's wall was much smaller than could be manufactured. Therefore a falling ball system was not pursued.

Rolling Ball Method

Two rolling ball systems were built by New Zealanders. These were very impressive machines for their time. In the first machine the stainless ball connected to a circuit when it reached the end of the tube. This was found to be unreliable, so in the second model the tube was rotated to an inclined angle for a set period of time. Once this time was up the tube was rotated back to the horizontal. The distance the ball traveled was then read from the markings on the tube.

The machine had the ability to produce accurate results as shown in FIG. 27.

The applicant investigated the falling ball viscometer, producing a prototype sensor which was tested on farm, but off line, with the results shown in FIG. 28. However this sensor was not developed further because it was clear that there were many moving parts that could lead to both a prohibitive cost and unsatisfactory reliability.

Flow-Out-Hole Method

Measuring the time taken for a fluid to flow out a hole is an accepted way to determine viscosity. For a time-dependant visco-elastic fluid, there are effects that alter the expected results. Attempts to automate measurement of the viscosity of the gel have led to a least three systems, the Wisconsin Mastitis Test[17], Brabant Mastitis Reaction[18] and an Italian sensor. The best published results came from the Italian sensor, and are shown in FIG. 31. This sensor gave a very linear result with SCC. However the time taken to produce a result was again prohibitive.

[17] Thompson D. and Postle D. The Wisconsin Mastitis Test—and indirect estimation of leucocytes in milk. Journal of milk food technology Vol 27 pg 271 275 1964.
[18] Van der Scahaaf A. Jaartsveld F. and Krammer-Zeeuw A. Influence of pH and temperature on the Brabant Mastitis Reaction. Journal of Comp Pathology Vol 74 pg 255–263 1964.

Considerations for SCC Sensor Implementation

There are a variety of different applications for which the somatic cell count (SCC) sensor technology can be envisioned, ranging from fully integrated automated milk sensor applications to simple stand-alone operation. The type and time of sampling is dependent on the application, and result presentation will also be different for each scenario, ranging from a simple indication of somatic cell count (SCC) to full integration with the milking system and/or herd management system.

1.3 Possible Implementation Schemes

The list of possible options and uses includes:

Stand alone unit with display only for testing suspicious cows or for groups of cows. Groups of cows could be sampled via the receiver, milk delivery line, or an intermediate holding tank.

On-line units with display only for continuous daily monitoring whenever the unit(s) are switched on. The display could be like a set of traffic lights indicating three selected bands. An audible signal could be added if desired. Installation options could include:

1 unit per milking stall 1 unit per two stalls with local sample collection 1 unit per 3 or 4 stalls with centralised or local sample collection Single units installed in 10% of the stalls and a pious faith in randomisation of individual cows throughout the stalls at successive milkings.

On-line system with reliable cow ID and central data processing for herd management purposes. The system is capable of printing alarm lists of individual cows as well as analysing weekly or monthly herd trends for new infections, duration of infections, spontaneous cure rates etc. Installation options could include:

1 unit per milking stall 1 unit per two stalls with local sample collection 1 unit per 3 or 4 stalls with centralised or local sample collection.

1 unit per 12–16 stalls with centralised sample collection from 3–4 stalls per unit.

1.4 Variation in SCC Over the Course of a Milking

In traditional herd testing, a representative sample of milk is taken from the whole milking of an individual cow. That is, the cow must have finished milking before the sampling process can be initiated or completed. Therefore, if an exact representative sample is required to be taken and analysed by the SCC gel sensor, the sample cannot be presented to the sensor until the cow has finished her milking. Such a delay would remove one of the significant potential advantages of an on-line SCC sensor. That is, the farmer is able to get an "instantaneous" estimate of each cow's SCC before the cow leaves her milking stall. An additional complication is that a representative sampling system would have to be developed so that a proportional sample could be presented to the SCC gel measuring system.

Therefore, a single 'spot' sample would be simpler and quicker in that the result could be available soon after the cow starts milking. The purpose of this section is to examine the limited number of scientific papers on how SCC changes throughout milking.

Variations in SCC in Uninfected Quarters

Typically, uninfected quarters have very low SCC and they show a small but progressive increase in SCC throughout milking. This conclusion is illustrated by the following two studies. VanGroenweghe et al. (2002)[19] analysed SCC levels in the foremilk, cisternal milk, main milk flow, strippings and residual milk in 12 uninfected cow quarters. Results are shown in FIG. 32. A log SCC of 4.0 is equal to 10,000 cells/mL and a log SCC of 5 is equivalent to 100,000 cells/mL.

[19] Van Groenweghe, F., Dosogne, H., and Burvenich, Composition and milk cell characteristics in quarter milk fractions of dairy cows with low cell count. The Veterinary Journal Vol 164 2002 254–260.

As shown in FIG. 30, the SCC level is low in foremilk and cisternal milk samples, slightly higher during the main period of milk flow, and highest at the end of milking. Because most farmers do not strip cows or inject cows with oxytocin to remove the residual milk, neither the strippings milk sample nor the residual milk sample is directly relevant to the main question posed in this section.

Results published by Hamann and Gyodi (1999)[20] are very similar. These authors used 8 cows and analysed quarter milk from first squirts, foremilk, main milk taking 40 ml over 20 seconds, and after machine milking. Their results, shown in FIG. 31, indicate that cell count rises throughout milking. Note that cell concentrations are approximately constant from the foremilk to the $3^{rd}$ milking fraction (taken 60 seconds into milking).

[20] Hamann, J., and Gyodi, P., Electrical conductivity in fraction-collected quarter milk samples with low somatic cell counts. Milchwissenschaft Vol 54 no 9 1999 487–490.

Results published by Woolford et al. (1998)[21] confirm these general SCC trends for uninfected quarters (see Table 6).

[21] Woolford, M., Williamson, J. M., and Henderson, H., Changes in electrical conductivity and somatic cell count between milk fraction from quarters sub clinically infected with particular mastitis pathogens. Journal of Dairy Research, Vol 65 1998 187–198.

Unpublished studies conducted by the applicant also show similar results. Consecutive 100 ml samples were manually taken from a single quarter over the course of a milking. Results shown in FIG. 32 indicate that, for low cell count cows, there could be "random" variation at any time due to the random nature of cells shedding into the milk. However, the SCC level is always low, that is under 120,000 cells/ml. This level is significantly below the first cut-off level of 200,000 cells/ml in the SCC gel sensor.

Variations in SCC in Infected Quarters

Holdaway et al. (1996)[22] found no statistical differences between foremilk and mid-milk samples in a study of bacteriologically-infected quarters of 121 cows in 3 herds. Results shown in Table indicate that infected quarters have a high SCC level of about 1 million cells/ml in foremilk and 1.5 million cells/ml in mid-milk fractions. The large standard error (of between 400 and 552 thousand cells/ml) implies considerable variation between quarters.

[22] Holdaway, R., Holmes, C., and Steffert I., A comparison of indirect methods for diagnosis of sub clinical intramammary infection in lactating diary cows. The Australian Journal of Dairy Technology. Vol 51, 1996 64–71

TABLE 5

SCC levels for infected quarters, Holdaway et al. (1996)[22].

| | Mean (SCC in 1000's cells/ml) | Standard Error (SCC in 1000's cells/ml) |
|---|---|---|
| Fore milk | 1,096 | 400 |
| Mid milk | 1,514 | 552 |
| Strippings | 2,089 | 671 |

Woolford et al. (1998)[43] related SCC to the bacterial type as well as the bacterial status of udders (Table). Interestingly, their results differ from those of Holdaway et al. in that they start high, are lower in mid-milk samples and then rise again in the strippings milk. These are relatively minor differences in the overall pattern of SCC changes, however.

TABLE 6

Changes in mean SCC (×1000 cells/mL) over milking by bacterial type, Woolford et al. (1998)[43]

| Infection status | No. of quarters | Fore milk | Mid milk | Strippings |
|---|---|---|---|---|
| S. Aureus | 9 | 2317 | 1146 | 2239 |
| S. uberis | 10 | 1607 | 988 | 1679 |
| Coagulase-negative staph. | 10 | 920 | 430 | 1102 |
| Uninfected quarters | 107 | 33 | 29 | 91 |

It should be noted that as different parts of the gland system milk out the cell count can change markedly for an infected udder or quarter. The part of the gland that has the infection may have a much higher SCC level than the rest of the milk flow. Although the exact nature of such changes remains elusive, it is clear than the SCC of an infected quarter will be significantly higher than that of uninfected quarters throughout milking.

Conclusions on Variation of SCC Over the Course of Milking

The published scientific literature confirms that:

The primary factor influencing SCC in milk is the presence of an intramammary infection Effects such as time of sampling between foremilk and main milk fractions are relatively minor for at least the first two thirds of a cow's milking Even though "random" variations in SCC levels may occur as the gland system milks out, taking a sample about 60 sec after the start of milking is acceptable Although spot samples taken 60 sec after the start of milking can be used with confidence to find udders or quarters that are likely to infected, the absolute results will not be exactly the same as herd test results for which samples are taken from the composite milk yield of an individual cow

1.5 Main Uses of the SCC Gel Sensor Outputs for Individual Cows or Quarters

Early Lactation

Early lactation in this instance is defined as: between 3–10 days post calving acc. to Hamann et al. (2004)[23]; or during the first month of lactation according to the NZ SAMM Plan[24].

[23] Hamann, J., Redetzky, R. & Grabowski, N. Th., 2004. Cow-side mastitis tests—possibilities and limitations. Proceedings 43rd Annual Meeting of NMC, NC, USA, pp 60–77.
[24] New Zealand Seasonal Approach to Managing Mastitis Plan. Booklet available from National Mastitis Advisory Committee, Livestock Improvement Corporation, www.lic.co.nz The main purpose is to detect cows whose composite udder milk exceeds a given threshold, thereby indicating a high likelihood of sub-clinical mastitis. The threshold may conform to local national or regional guidelines (e.g., 150K for heifers in NZ, 200K for mature cows in NZ, 250K for heifers or cows in Australia).

If desired, individual quarters of these udders could be checked using an SCC test, or CMT or an electrical conductivity screening test.

We do not make recommendations for treatment of sub-clinical quarters during lactation. Instead, it is advised that local national or regional recommendations for antibiotic or other treatment of high SCC quarters are followed:

to improve the likelihood of cure because of early detection to reduce the likelihood that an infection will become chronic or will increase the new infection risk in other uninfected cows/quarters to reduce the Bulk SCC (BSCC)

to improve compositional quality of milk in the bulk tank (Barbano, NMC 2004)[25].

[25] Barbano, D. 2004. The role of milk quality in addressing dairy food marketing opportunities in a global environment. Proc. 43rd Annual Meeting of NMC, NC, USA, pp 47–51.

Main Period of the Lactation

The main purpose throughout mid-lactation is to manage the bulk tank SCC, especially at times when the BSCC is trending upwards and approaching a threshold that would mean loss of premium payments or imposition of a penalty payment. This requires the capability to print an alarm list of, say, the highest 5% of cows in the herd.

Late Lactation

The main purpose in late lactation is to detect cows that exceed a given threshold thereby indicating a high probability of sub-clinical mastitis.

If desired, individual quarters of these udders could be checked using an SCC test, or CMT or an electrical conductivity screening test.

We recommend users follow local national or regional recommendations for antibiotic or other treatment of high SCC quarters. For example, the protocol shown on page 75 of Hamann et al. (2004)[23], suggests:

to select cows for dry cow therapy or teat sealant to make decisions on which cows to cull or keep.

The schematic in FIG. 33 shows the principle liquid flow inside the apparatus. The three dotted lines on the left indicate the option of having multiple sample tubes joining into one milk inlet at the top of the mixing chamber for four-quarter analysis. Refer to Table 7 for a more detailed physical description of the apparatus layout.

TABLE 7

List of main components

| No. | Identification | Type | Description |
|---|---|---|---|
| 1 | P1 | Peristaltic Pump | Single channel (milk) |
| 5 | S1 | Pinch Valve | Normally open (servo driven roller) |
| 6 | P5 | Peristaltic Pump | Single channel (reagent) |
| 7 | P6 | Peristaltic Pump | Single channel (waste) |
| 8 | V1 | 2-Port Valve | Atmospheric bleed (waste chamber) |
| 9 | V2 | 2-Port Valve | Reagent distribution to flow cell |
| 12 | MS1 | Conductivity Probe | Mixing chamber, level detection low |
| 13 | MS2 | Conductivity Probe | Mixing chamber, level detection medium |
| 14 | MS3 | Conductivity Probe | Mixing chamber, level detection high |
| 15 | FS1 | Conductivity Probe | Flow cell, level detection bottom |
| 16 | FS2 | Conductivity Probe | Flow cell, level detection top |
| 25 | W1 | Sample Well | Sampler body for online sampling |
| 26 | C1 | Container | Milk sample container for bench top testing |

The invention claimed is:

1. A method of testing a milk flow for mastitis, the method including
   (i) diverting a sample flow from the milk flow,
   (ii) providing an inflow of an anionic detergent and an inflow of the milk sample in predetermined proportions into a dwell zone, and an outflow of a detergent/milk admixture as a gelling and/or gelled product,
   (iii) feeding the outflow admixture product from the dwell zone to a viscosity testing zone, and
   (iv) testing, in the viscosity testing zone, the outflow admixture product for viscosity and generating an output signal indicative of the viscosity, and
   (v) if necessary, clearing the viscosity testing zone, or the viscosity testing zone and the dwell zone of the admixture without feedback into the milk flow from which the sample flow was diverted.

2. A method of determining if there is a somatic cell count change between milkings in the milk of an animal by applying the method as claimed in claim 1 to separate milkings, and comparing data resulting from the testings to determine any somatic cell count change.

3. A method of as claimed in claim 1 wherein the gelling is dependent upon at least part of the DNA of somatic cells.

4. A method as claimed in claim 1 wherein the milk flow is from a single animal and an identifier of that animal and an indicator of viscosity and thus of the somatic cell count is coupled for comparative purposes.

5. A method of claim 1 wherein the inflows are not mixed prior to the dwell zone.

6. A method of claim 1 wherein the milk flow is the milk from at least one teat of a known animal, such animal being identified by an output signal from an animal identifying sensor.

7. A method as claimed in claim 1 wherein a receiver receives the output signal indicative of viscosity and associates such output signal with the animal by reference to either an input signal or a the animal identifying the sensor output signal.

8. A method as claimed in claim 7, wherein the data received by the receiver is stored for comparative purposes with subsequent data received at subsequent milkings from the same animal.

9. A method as claimed in claims 1 wherein the sample flow is drawn off a milk flow during milking, such draw off being substantially identical for each milking having regard to
   (i) commencement of milking generated milk flow,
   (ii) duration or volume of draw off, and/or
   (iii) elapsed milk flow.

10. A method as claimed in claim 1 wherein the testing in the viscosity testing zone of the outflow admixture product for viscosity is whilst the partly gelled product is stationary.

11. A method as claimed in claim 10 wherein a rolling ball test for viscosity is utilised which generates the output signal indicative of such viscosity, such output signal being an elapsed time or a function of an elapsed time.

12. A method of claim 11 wherein there is a vacuum recocking of the ball for a subsequent viscosity test along with the emptying of the already tested admixture product from the viscosity testing zone or the viscosity testing zone and the dwell zone.

13. A method as claimed in claim 1 wherein the dwell zone and the viscosity testing zone are a common chamber of apparatus into which the inflows are provided.

14. A method of testing a milk flow for mastitis as claimed claim 1 wherein there is also provided
   an animal identifier input or signal capable of identifying the animal to data acquisition, analysis and storage means.

15. A method of testing a milk flow for mastitis, as claimed in any one of claim 1 wherein there is also provided
   an outflow of the at least partially gelled mixture of the dwell zone to and/or through and/or using a viscosity testing zone and (immediately or subsequently) generating an output signal to the data acquisition, analysis and storage means indicative of the viscosity of a predetermined part of the mixture that has been subject to a predetermined gel forming dwell time post mixing (whether prior to, during or post the inflow(s)).

16. A method as claimed in claim 1 wherein the predetermined proportions of anionic detergent and milk inflow are in the volume ratios of 5:1 to 1:5.

17. A method as claimed in claim 1 wherein the predetermined proportions are in the range of from 2:1 to 1:2 inclusive.

18. A method as claimed in claim 1 wherein the predetermined proportions are substantially 1:1.

19. A method of claim 1 wherein the anionic detergent is a Gardinol Type Detergent as defined in the Merck Index.

20. A method as claimed in claim 19 wherein the anionic detergent is an aqueous solution of about 2% weight by volume sodium laurel sulphate.

21. A method as claimed in claim 1 used for testing an animal for mastitis by on-line testing of milk from such an individual animal as it is being milked.

22. Apparatus in or associated with a milk flow path for milk of an individual animal from at least one cup of a milking claw to an accumulation reservoir or conduit for such flow, the apparatus including:
   (i) means defining a liquid chamber having an ability to receive two inlet feeds,
   (ii) one inlet feed to be an inflow of a sample flow of milk from the milk line, and
   (iii) the other inlet feed to be an inflow of an anionic detergent of a kind that will cause a viscosity increase as a result of at least partial gelling of the resultant milk/detergent fluid, and
   (iv) means to provide a measure of and to generate a data output indicative of the viscosity of at least part of the resultant milk/detergent fluid calibratable to the somatic cell count of the milk inflow,
   (v) and means to clear the milk/detergent fluid from the apparatus without contamination of milk in the milk line in order to allow a subsequent milk flow sample to be likewise tested.

23. Apparatus as claimed in claim 22 wherein the apparatus is such that an identical testing regime is followed for each sample taken from the milk flow such that for an individual animal or as between individual animals, or both, there is a comparative basis.

24. Apparatus as claimed in claim 22 wherein there is provided data acquisition, analysis and storage means and there is provided means to provide an animal identifier input or signal capable of identifying an animal being milked to the data acquisition, analysis and storage means, and the means able to generate an output signal to the data acquisition, analysis and storage means indicative of the viscosity of the milk sample gel in the apparatus for tying to the animal identified.

25. Apparatus as claimed in claim 22 wherein the apparatus includes a rolling ball type viscosity tester capable of generating an output signal reliant on a elapsed time or a function of elapsed time.

26. Apparatus as claimed in claim 22 to test milk of an animal being milked for somatic cells and thus testing the animal being milked for mastitis.

27. An apparatus as claimed in claim 22 used for determining whether or not there is a somatic cell count change between milkings in milk of an animal by comparing data resulting from separate milkings to determine any somatic cell count change.

28. Apparatus of claim 27 wherein there is means that uses an appropriate surfactant to generate a gel from the milk sample, means to test the gel thus generated for viscosity or some function of viscosity and means to cause or allow the gel to clear from the apparatus.

29. Apparatus as claimed in claim 22 also including
   (i) means defining a second chamber to receive at least part of the resultant milk/detergent fluid from the first chamber,
   (ii) means to provide a measure indicative of viscosity or a function of viscosity of the resultant milk/detergent fluid in the second chamber calibratable to the somatic cell count of the sample flow of milk, and
   (iii) means to generate a data output indicative of the measure.

30. Apparatus as claimed in claim 29 wherein the means to provide a second chamber is or includes the barrel of a rolling ball viscometer.

31. Apparatus as claimed in claim 30 wherein the means to provide a measure indicative of viscosity are spaced sensors of a rolling ball viscometer.

32. Apparatus as claimed in claim 29 wherein the means defining a first chamber and the means defining a second chamber are interconnected such that a chamber is defined into which there is adapted to be a greater infeed of fluids than outfeed therefrom thereby in use ensuring, for at least part of the milk/detergent fluid, a reproducible gelling time at which the fluid is measured by the means to provide a measure.

33. Apparatus as claimed in claim 22 having means adapted in use to reproducibly control the two inlet feeds.

34. Apparatus as claimed in claim 22 wherein there is provision in the means to provide a measure whereby the milk/detergent fluid can be cleared from the apparatus without contamination of milk in the milk line in order to allow a subsequent milk flow sample to be likewise tested.

* * * * *